(12) United States Patent
Ikeda et al.

(10) Patent No.: US 11,504,615 B1
(45) Date of Patent: Nov. 22, 2022

(54) ELECTRONIC CONTROLLER WITH LINEAR HAND STRAP ADJUSTER

(71) Applicant: Valve Corporation, Bellevue, WA (US)

(72) Inventors: John Ikeda, Seattle, WA (US); Clement Gallois, Seattle, WA (US); Ichiro Yamada, Issaquah, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 17/303,016

(22) Filed: May 18, 2021

(51) Int. Cl.
  *A63F 13/245* (2014.01)
  *A44B 11/28* (2006.01)
  *G06F 3/01* (2006.01)

(52) U.S. Cl.
  CPC ............ *A63F 13/245* (2014.09); *A44B 11/28* (2013.01); *G06F 3/014* (2013.01); *A63F 2300/8082* (2013.01)

(58) Field of Classification Search
  CPC .................. A63F 13/24; A63F 13/245; A63F 2300/8082; A44B 11/28; G06F 3/014
  See application file for complete search history.

(56) References Cited

U.S. PATENT DOCUMENTS

| | | | | |
|---|---|---|---|---|
| 4,491,325 A | * | 1/1985 | Bersheim | A63F 13/428 74/471 XY |
| 5,184,120 A | * | 2/1993 | Schultz | G06F 3/023 708/145 |
| 5,764,164 A | * | 6/1998 | Cartabiano | G06F 3/014 400/100 |
| 5,960,509 A | * | 10/1999 | Wu | A46B 17/02 403/93 |
| 6,222,526 B1 | * | 4/2001 | Holmes | G06F 3/0338 345/161 |
| 6,570,078 B2 | | 5/2003 | Ludwig | |
| 8,754,746 B2 | | 6/2014 | Lukas et al. | |
| 9,407,743 B1 | * | 8/2016 | Hirshberg | H04B 1/385 |
| 9,950,256 B2 | | 4/2018 | Lim | |
| 10,061,458 B1 | * | 8/2018 | Bristol | G06F 3/03547 |
| 10,391,400 B1 | * | 8/2019 | Mucha | A63F 13/214 |
| 10,427,035 B2 | | 10/2019 | Schmitz et al. | |

(Continued)

OTHER PUBLICATIONS

SlagCoin Instruction Manual for a Joystick Controller "SlagCoin Appendix—Joystick Controller" last updated Feb. 25, 2009 www.slagcoin.com/joystick.html 52 pages.

(Continued)

*Primary Examiner* — Steven J Hylinski
(74) *Attorney, Agent, or Firm* — Lee & Hayes, P.C.

(57) ABSTRACT

A controller for an electronic system may include a linear hand strap adjuster to accommodate different hand sizes of users who may hold the controller in their hand. For example, a linear slot may be defined in the handle at a proximal end of the handle that is adjacent to the neck region where the handle is adjoined to the head. The linear slot may extend longitudinally along the handle. An anchor disposed within the linear slot may protrude from the outer surface of the handle to provide a point of attachment for an end of the hand strap. Accordingly, a first end of the hand strap is configured to be coupled to the anchor, and the anchor is movable along the linear slot to adjust the first end of the hand strap.

20 Claims, 14 Drawing Sheets

(56) References Cited

U.S. PATENT DOCUMENTS

| | | | |
|---|---|---|---|
| 10,441,881 B2 | 10/2019 | Burgess et al. | |
| 10,549,183 B2* | 2/2020 | Hope | A63F 13/428 |
| 10,649,583 B1* | 5/2020 | Leinbaugh | G06F 3/044 |
| 10,691,233 B2* | 6/2020 | Dalton | G06F 3/03547 |
| 10,845,895 B1* | 11/2020 | Jentz | G06F 3/0304 |
| 10,874,939 B2* | 12/2020 | Nietfeld | B25J 13/02 |
| 10,888,773 B2* | 1/2021 | Campbell | G06F 3/038 |
| 10,898,797 B2* | 1/2021 | Petersen | A63F 13/24 |
| 10,987,573 B2* | 4/2021 | Nietfeld | G06F 3/0346 |
| 11,130,050 B2* | 9/2021 | Nakagawa | A63F 13/24 |
| 11,185,763 B2* | 11/2021 | Bradner | A63F 13/428 |
| 2001/0035856 A1* | 11/2001 | Myers | G06F 3/0354 |
| | | | 345/156 |
| 2002/0067036 A1* | 6/2002 | Young | A63C 11/2224 |
| | | | 280/819 |
| 2002/0175894 A1* | 11/2002 | Grillo | G06F 3/014 |
| | | | 345/156 |
| 2003/0090465 A1* | 5/2003 | Dellinger | G06F 3/0233 |
| | | | 345/167 |
| 2006/0111180 A1 | 5/2006 | Cheng | |
| 2007/0279380 A1* | 12/2007 | Murillo | G06F 3/03549 |
| | | | 345/161 |
| 2008/0136778 A1* | 6/2008 | Hursh | G06F 3/014 |
| | | | 345/164 |
| 2008/0261695 A1 | 10/2008 | Coe | |
| 2009/0038721 A1* | 2/2009 | Wakitani | A63F 13/24 |
| | | | 150/154 |
| 2009/0111580 A1* | 4/2009 | Nakajima | A63F 13/08 |
| | | | 463/43 |
| 2009/0205878 A1 | 8/2009 | Taylor | |
| 2009/0209346 A1* | 8/2009 | Cheng | A63F 13/211 |
| | | | 463/37 |
| 2009/0253520 A1* | 10/2009 | Lewis-Picard | A63F 13/02 |
| | | | 463/47 |
| 2012/0244944 A1* | 9/2012 | Kotkin | A63F 13/24 |
| | | | 463/37 |
| 2013/0059696 A1* | 3/2013 | Hijmans | A63B 23/03525 |
| | | | 482/8 |
| 2016/0342218 A1* | 11/2016 | Burba | G06F 3/0338 |
| 2017/0189800 A1 | 7/2017 | Crain | |
| 2017/0235364 A1* | 8/2017 | Nakamura | G06F 3/016 |
| | | | 345/156 |
| 2018/0067545 A1* | 3/2018 | Provancher | G06F 3/011 |
| 2018/0099219 A1* | 4/2018 | Hope | A63F 13/213 |
| 2018/0161670 A1* | 6/2018 | Boev | A63F 13/24 |
| 2019/0009172 A1* | 1/2019 | Sawai | G05G 1/00 |
| 2019/0176033 A1* | 6/2019 | Ironmonger | G06F 3/0202 |
| 2019/0308110 A1* | 10/2019 | Muramatsu | G06F 3/0338 |
| 2020/0061455 A1* | 2/2020 | Muramatsu | A63F 13/23 |

OTHER PUBLICATIONS

WICO Corporation Consumer Division Manual for "WICO Command Control" Trackball controller, 1982, 6 pages.

International Search Report and Written Opinion for PCT Application No. PCT/US22/2S541, dated Jun. 7, 2022, 7 pages.

\* cited by examiner (SECTION A-A)

(SECTION A-A)

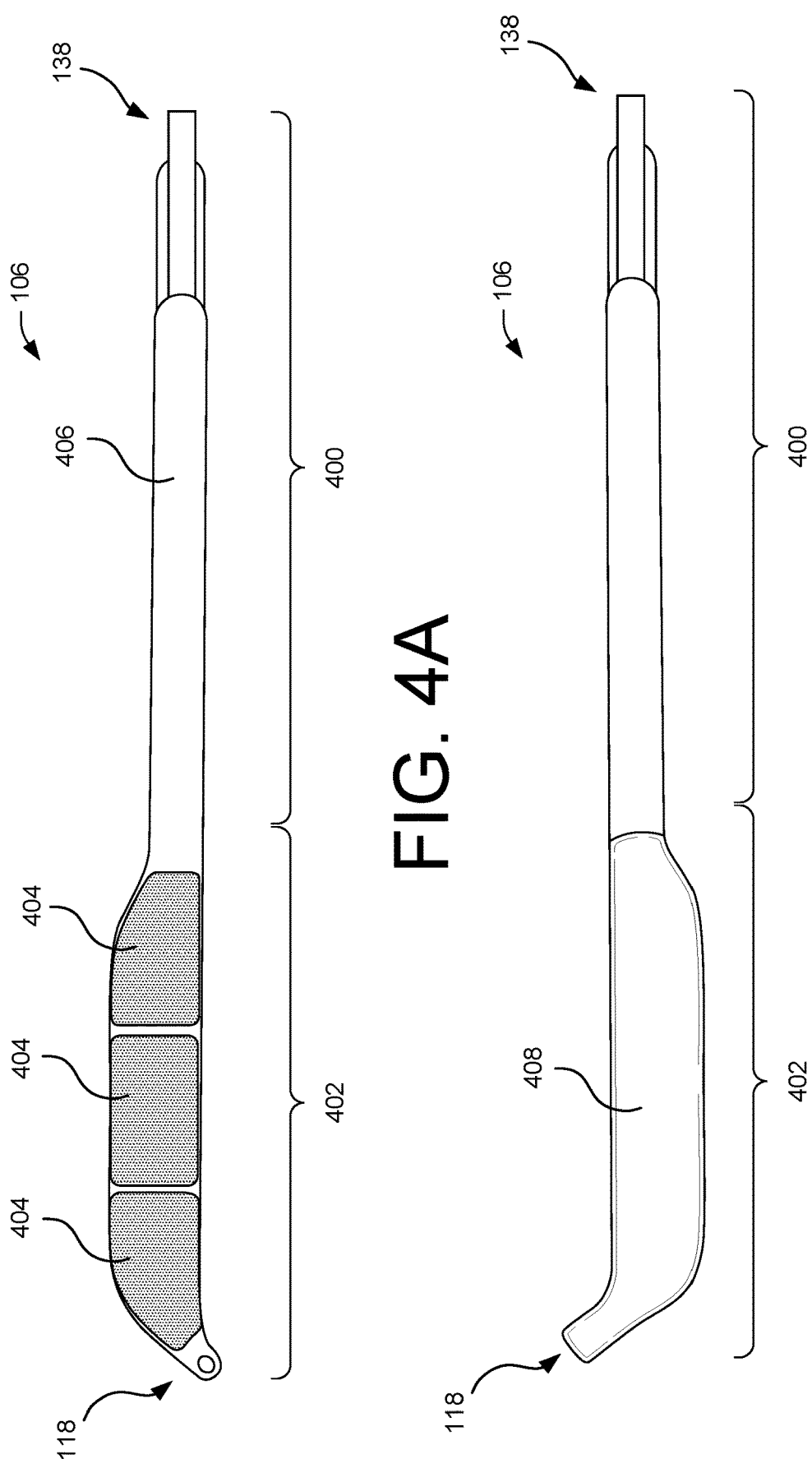

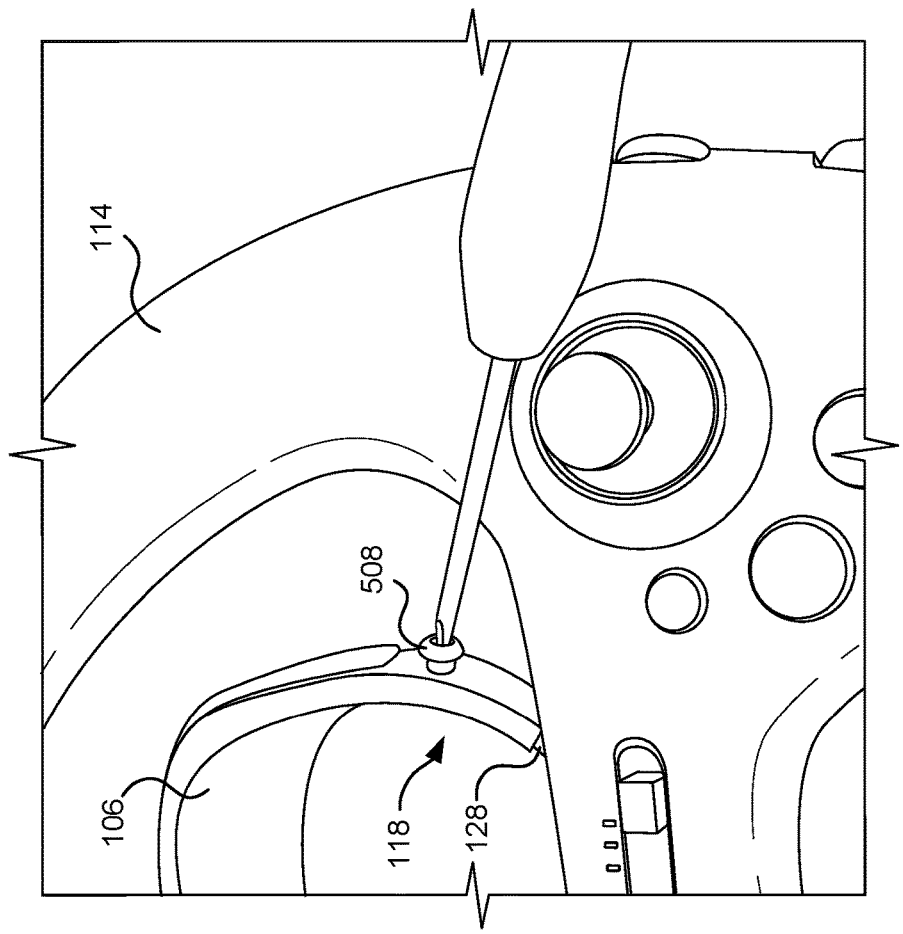
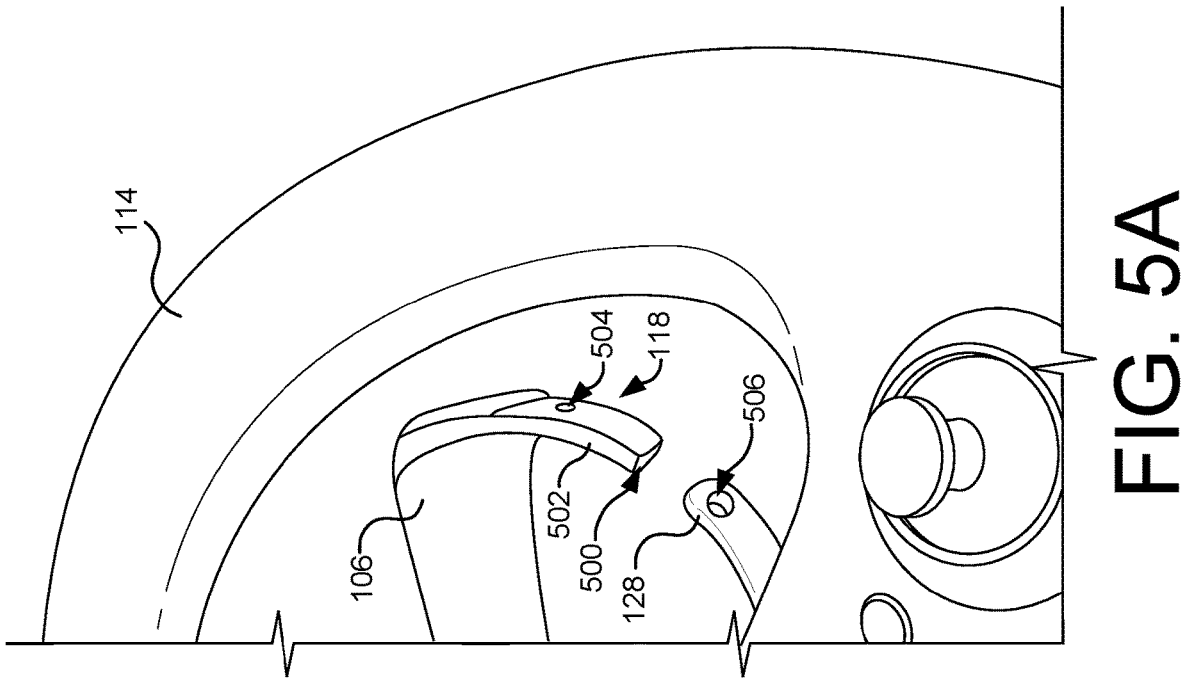

ELECTRONIC CONTROLLER WITH LINEAR HAND STRAP ADJUSTER

BACKGROUND

Various handheld video game controllers have been designed for a variety of gaming systems, including virtual reality (VR) systems. Some VR controllers include a lanyard that can be looped around the wrist in order to prevent the controllers from falling to the floor when dropped, thereby preventing damage to the controller. Nevertheless, a lanyard does not prevent the controller from falling out of the hand when dropped. Aftermarket hand strap accessories are available for some VR controllers, but they tend to be difficult to use and uncomfortable to wear for long periods. The disclosure made herein is presented with respect to these and other considerations.

BRIEF DESCRIPTION OF THE DRAWINGS

FIG. 4A illustrates a plan view of an outer surface of an example hand strap.

FIG. 4B illustrates a plan view of an inner surface of the hand strap depicted in FIG. 4A.

FIG. 5A illustrates an operation of inserting an anchor into a cavity of an anchor attachment mechanism at a first end of the hand strap.

FIG. 5B illustrates an operation of coupling the first end of the hand strap to the anchor.

FIG. 7B illustrates the anchor attachment mechanism as it is being attached to an example anchor of an adjustment mechanism of the controller.

FIG. 8 illustrates the anchor attachment mechanism as it is being attached to an example anchor of an adjustment mechanism of the controller.

DETAILED DESCRIPTION

Figure 1:
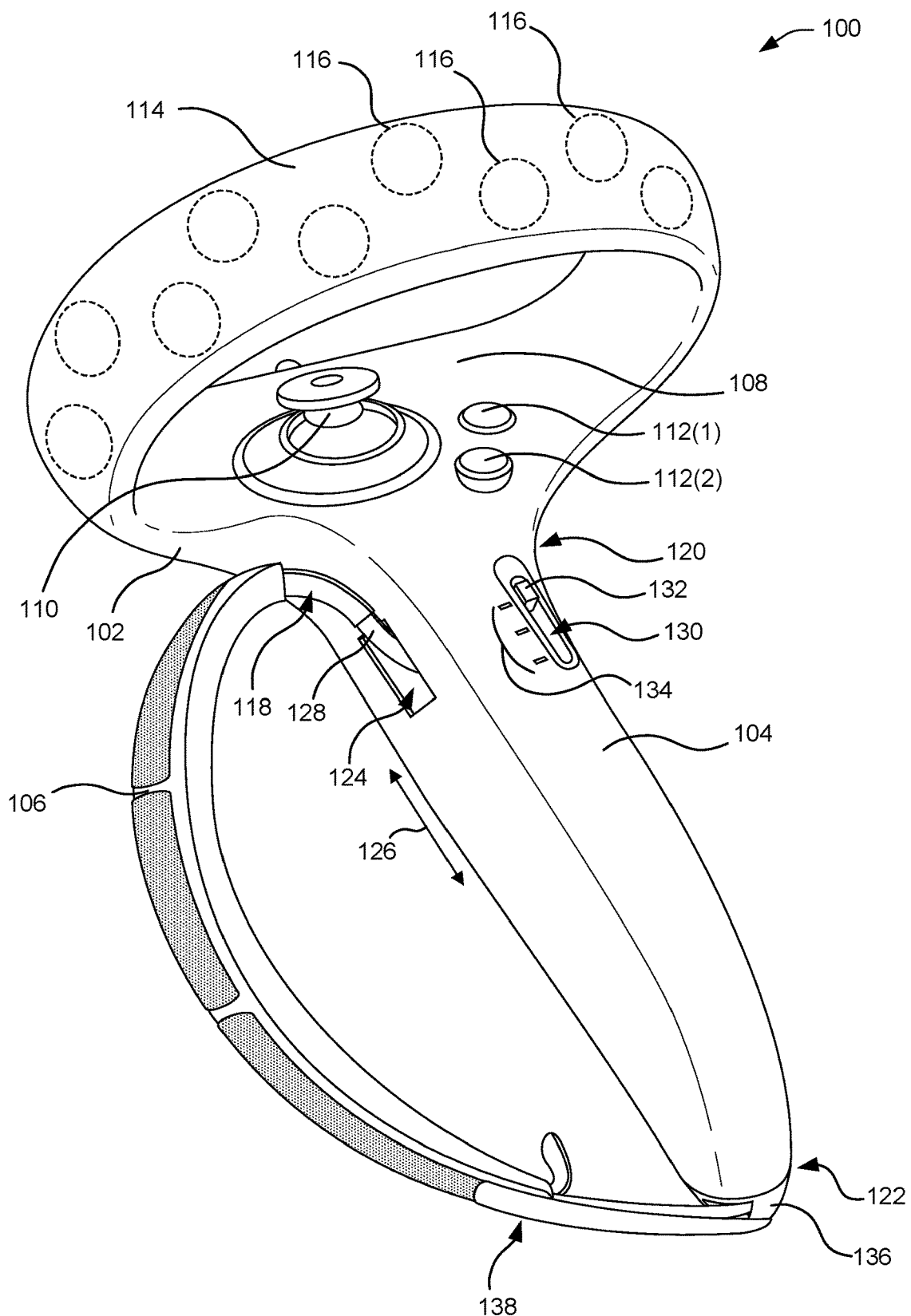
FIG. 1 illustrates a perspective view of an example controller having a linear hand strap adjuster.

Disclosed herein is, among other things, a controller for an electronic system, the controller having a linear hand strap adjuster. The linear hand strap adjuster of the controller is an ergonomic solution for accommodating different hand sizes of users who may hold the controller in their hand. In an example implementation, the electronic system is a virtual reality (VR) system, such as a VR gaming system. It is to be appreciated, however, that the controller disclosed herein may be used for controlling applications in a wide variety of systems, such as or augmented reality (AR) systems, industrial machine systems, defense systems, robotic systems, and the like. Although many of the examples described herein pertain to a controller of a VR gaming system, it is to be appreciated that the controller disclosed herein is not limited to use with a VR gaming system, and that the controller may be used outside of the video game industry and/or in non-VR systems.

The controller disclosed herein may include a controller body. The controller body may include a head and a handle adjoining the head at a neck region. The head may include at least one thumb-operated control (e.g., a thumbstick, a button(s), etc.) and/or a tracking member extending from the head. In general, a user can hold the controller in his/her hand by grasping the handle, and the user may use the controller in various ways to interact with an electronic system (e.g., to play a VR game). It is to be appreciated that a user may hold two of the disclosed controllers at a given time; one controller in each hand. Accordingly, while many of the examples described herein pertain to a left-handed controller, it is to be appreciated that a right-handed controller may mirror certain features of the disclosed left-handed controller, such a hand strap configured to be coupled to the opposite side of the controller body, a mirrored adjustment mechanism for adjusting the hand strap, a mirrored arrangement of thumb-operated controls, and the like.

The hand strap of the controller is configured to physically bias the palm against an outer surface of the handle and thereby retain the controller to the hand of the user. Accordingly, the hand strap allows the user to release his/her grip on the handle without any risk of the controller dropping to the floor. Thus, the hand strap alleviates concerns of the controller being damaged during use. The hand strap also allows for carrying out a wider range of motions, such as a throwing motion, where the natural instinct of the user is to let go of the handle at the end of the throwing motion. In an illustrative example, a user might be playing a VR game that involves throwing an object, such as a baseball, an axe, or a similar object, and the user may execute a throwing motion where the user's hand releases the controller at the end of the throwing motion. In this scenario, the hand strap of the controller prevents the controller from falling out of the user's hand because the user's palm remains in contact with the outer surface of the handle even though the user's hand is open.

In order to accommodate for different hand sizes of users, the controller disclosed herein includes a mechanism to adjust the hand strap in a linear fashion. For example, a linear slot may be defined in the handle at a proximal end of the handle that is adjacent to the neck region where the handle is adjoined to the head. Furthermore, the linear slot may extend longitudinally along the handle. An anchor disposed within the linear slot may protrude from the outer surface of the handle to provide a point of attachment for a first end of the hand strap. Accordingly, the first end of the hand strap is configured to be coupled to the anchor, and the anchor is movable along the linear slot to adjust the first end of the hand strap. That is, the first end of the hand strap may be adjusted towards or away from the distal end (or free end) of the handle. The first end of the hand strap may be adjusted towards the distal end of the handle to accommodate a hand with a longer thumb so that the end of the thumb can be positioned directly over an area encompassing the thumb-operated control(s) disposed on the head of the controller body. Conversely, the first end of the hand strap may be adjusted away from the distal end of the handle to accommodate a hand with a shorter thumb (e.g., a hand of a child) so that the end of the thumb can reach, and be positioned directly over, an area encompassing the thumb-operated control(s) disposed on the head of the controller body.

As described in detail herein, the adjustment of the first end of the hand strap is constrained to a linear path that runs longitudinally along the handle, which allows the user to adjust the hand strap to optimize the spacing between the thumb-operated controls and the metacarpophalangeal joint at the base of the thumb without having to twist the hand strap transversely across the handle. The act of twisting the hand strap across the handle during adjustment tends to twist the user's grip circumferentially around the handle. The disclosed linear hand strap adjuster does not change the user's grip on the handle, which helps to maintain a consistent finger placement on the handle, which, in turn, helps with the calibration of finger tracking sensors in the handle. Furthermore, the adjustment of the first end of the hand strap is decoupled from a separate adjustment of the tightness of the hand strap around the back of the hand. In this way, an adjustment of one does not affect the other in a negative way. In addition, the hand strap is removable from the controller body, thereby allowing a user to replace the hand strap with another hand strap, to clean the hand strap, or the like. Additional technical effects can also be realized from an implementation of the technologies disclosed herein.

Also described herein is a process attaching the hand strap to the controller body of the controller and for adjusting the hand strap. An example process may include attaching a first end of the hand strap to an anchor disposed within a linear slot defined in a handle of the controller body at a proximal end of the handle where the handle adjoins a head of the controller body, the linear slot extending longitudinally along the handle, and adjusting the first end of the hand strap by moving the anchor along the linear slot. The process may further include passing a second end of the hand strap through an eyelet disposed at a distal end of the handle, pulling the second end of the hand strap while a hand is gripping the handle to pass a first portion of the hand strap through the eyelet until an inner surface of a second portion of the hand strap comes into contact with a back of the hand, and attaching the first portion of the hand strap to an outer surface of the second portion of the hand strap. The linear hand strap adjuster will now be described in detail with reference to the figures.

FIG. 1 illustrates a perspective view of an example controller 100. The controller 100 may be utilized as part of an electronic system such as a VR video gaming system, a robot, a weapon, a medical device, or any suitable type of electronic system. The controller 100 depicted in FIG. 1 may be the left controller (or the left-handed controller) of a pair of controllers that includes a similar right controller (or right-handed controller). In certain embodiments, the controllers (including the controller 100) may (together) track the motion and the grip of both of a user's hands to enhance a VR experience.

The controller 100 may include a controller body 102 having a handle 104, and a hand strap 106 (sometimes referred to herein as a "hand retainer 106") to retain the controller 100 in the hand of a user (e.g. the user's left hand), such as by physically biasing the palm of the user's hand against an outer surface of the handle 104. The handle 104 may comprise a tubular housing that may optionally be substantially cylindrical. In this context, a substantially cylindrical shape need not have a constant diameter, or a perfectly-circular cross-section. The word "circumference" is used herein whether or not the tubular handle 104 has a circular cross-section. Herein, the term "circumference" implies the complete perimeter about the handle 104, which may be circular if the tubular handle 104 is a right circular hollow cylinder, but which may be a closed shape other than a circle if the tubular housing is shaped as a non-circular cylinder or hollow prism.

In the example of FIG. 1, the controller body 102 may include a head 108, which may adjoin the handle 104 at a neck region, and which may include one or more thumb-operated controls 110, 112(1), and/or 112(2). In the example of FIG. 1, a first thumb-operated control 110 is in the form of a thumbstick (or a joystick). The first thumb-operated control 110 may be disposed at or near a center of the head 108 for manipulation (e.g., actuation by deflecting the thumbstick, pressing the thumbstick, etc.) by the thumb of the user holding the controller 100. A second thumb-operated control 112(1) and a third thumb-operated control 112(2) are depicted as buttons in FIG. 1, such as an "A" button and a "B" button. The second and third thumb-operated controls 112(1) and 112(2) may be disposed adjacent to the first thumb-operated control 110 and adjacent to each other to allow the user to quickly reposition the thumb from one control (e.g., 110) to another control (e.g., 112(1) or 112(2)).

The controller body 102 may include a tracking member 114. In the example of FIG. 1, the tracking member 114 is in the form of a tracking ring (e.g., having a circular shape), and the tracking member 114 extends from the head 108. For example, the front of the head 108 may begin to curve upward at the sides of the head 108 and may continue curving at a substantially constant radius of curvature until the two sides meet at a point that is spaced a distance in front of (or over) the head 108, thereby forming a ring-shaped tracking member 114. The tracking member 114 may include a plurality of tracking elements 116 disposed therein and/or thereon. The tracking elements 116 may be spatially distributed about the tracking member 114 as an array of tracking elements 116. The tracking elements 116 are not necessarily of equal size and do not necessarily have equal spacing between them, although an array of equal-sized tracking elements 116 may be evenly spaced about the tracking member 114. The tracking elements 116 are described in more detail with reference to FIG. 12. In general, the tracking elements 116 may be used as part of a positional tracking system that allows for tracking the position and/or orientation of the controller 100 in space. Such positional tracking may enhance a VR experience.

In some examples, the hand strap 106 may be biased in the curved, open position depicted in FIG. 1. This may be enabled by a curved resilient member (e.g. an internal or external elastically deformable strip, such as a metal strip) of the hand strap 106. In other words, the curved resilient member may endow the hand strap 106 with structure to keep the hand strap 106 in the curved, open position depicted in FIG. 1. This curved, open position may facilitate the insertion of the user's left hand between the hand strap 106 and the handle 104 when the user is about to grasp the controller 100 with vision blocked by a head-mounted display (HMD) (e.g., a VR headset, goggles, etc.). In some examples, a curved resilient member may be a flexible metal strip that elastically bends, or may be made of a plastic material such as nylon that may bend substantially elastically. Such a curved resilient member may be partially or completely internal to or covered by a fabric material of the hand strap 106, for the user's comfort. Alternatively, a resilient member may be disposed on (e.g., adhered to) a side of the fabric material of the hand strap 106. The hand strap 106 may be configured to contact the back of the user's hand after tightening the hand strap 106 over the hand. When tightened, the hand strap 106 physically biases the user's palm against the outer surface of the handle 104. In this way, the hand strap 106, when tightened around the hand, may retain the controller 100 to the hand even when the hand is not grasping the handle 104.

When the hand strap 106 is tightened around, or over, the hand, it may serve not only to prevent the controller 100 from falling out of the hand, but also to keep the fingers of the hand from excessively translating relative to an array of proximity sensors of the handle 104, to more reliably sense finger motion. The electronic system may include an algorithm embodying anatomically-possible motions of fingers, to use the sensing from the proximity sensor array to render the opening of a controlled character's hand, finger pointing, or other motions of fingers relative to controller or relative to each other. In this way, the user's movement of the controller 100 and/or the fingers may help control a VR gaming system, defense system, medical system, industrial robot or machine, or another device. In VR system applications (e.g. for gaming, training, etc.), the system may render a throwing motion based on the movement of the tracking elements 116, and may render the release of a thrown object based on the sensed release of the user's fingers from the outer surface of the handle 104 of the controller 100. The function of the hand strap 106 (to allow the user to "let go" of the controller 100 without the controller 100 actually separating from the hand or being thrown or dropped to the floor) may enable additional functionality of the controlled electronic system. For example, if the release and restoration of the user's grasp of the handle 104 of the controller body 102 is sensed, then such release or grasping may be incorporated into the game to display (e.g. in VR) throwing or grasping objects. The hand strap 106 may allow such a function to be accomplished repeatedly and safely.

The hand strap 106 may be adjustable in various ways. In discussing the ways of adjusting the hand strap 106, reference is made to the opposing ends of the handle 104. The proximal end 120 (or the top) of the handle 104 is adjacent to the neck region that adjoins the head 108 and the handle 104. The distal end 122 (or the bottom) of the handle 104 is the end of the handle 104 that is farthest from the head 108. The distal end 122 of the handle 104 is sometimes referred to herein as the "free end 122" of the handle 104. In a first way of adjusting the hand strap 106, a user may adjust a first end 118 of the hand strap 106 near the proximal end 120 of the handle 104 by moving the first end 118 along a linear path. In an illustrative example, a linear slot 124 may be defined in the handle 104 at the proximal end 120 of the handle 104. The linear slot 124 may extend longitudinally 126 along the handle 104 (as opposed to transversely across the handle 104). The first end 118 of the hand strap 106 is configured to be coupled to an anchor 128 disposed within the linear slot 124 and protruding from the outer surface of the handle 104 so that the anchor 128 is accessible for coupling the first end 118 of the hand strap to the anchor 128 and for decoupling the first end 118 of the hand strap from the anchor 128, as desired. The anchor 128 may be movable along the linear slot 124 to adjust the first end 118 of the hand strap 106. For example, the anchor 128 may be movable along the linear slot 124 to adjust the first end 118 of the hand strap 106 towards or away from the distal end 122 of the handle 104. Said another way, the anchor 128 may be movable along the linear slot 124 to adjust the first end 118 of the hand strap 106 lengthwise (or longitudinally 126) along the handle 104. This allows a user with a larger hand (and longer thumb) to grip the handle 104 lower down on the handle 104 (e.g., closer to the distal end 122 of the handle 104) and to adjust the anchor 128 towards the distal end 122 of the handle 104 until the first end 118 of the hand strap 106 comes into contact with the purlicue of the hand. Meanwhile, a user with a smaller hand (and shorter thumb) may grip the handle 104 farther up on the handle 104 (e.g., closer to the proximal end 120 of the handle 104) so that the relatively shorter thumb can reach the thumb-operated control(s) 110, 112(1), 112(2). The hand strap 106 also prevents the hand from moving relative to the handle 104 while the user is using the controller 100, thereby helping to maintain a consistent finger placement on the handle 104 that helps calibrate finger tracking sensors (e.g., proximity sensors) in the handle 104.

In the example of FIG. 1, a second linear slot 130 may be defined in the handle 104 at the proximal end 120 of the handle 104. The second linear slot 130 may extend longitudinally 126 along the handle 104. In this example, the handle 104 includes a front that faces the user when the controller 100 is held in the hand, a back opposite the front, and two sides between the front and back of the handle 104, and the first linear slot 124 is defined in one of the two sides of the handle 104 while the second linear slot 130 is defined in the front of the handle 104. In other words, the first linear slot 124 and the second linear slot 130 may be spaced apart from each other in a circumferential direction at the proximal end 120 of the handle 104. The second linear slot 130 may be offset from the center of the front of the handle 104 so that the slot 130 is positioned at a location on the handle 104 that is unlikely to encounter inadvertent, or spurious, contact by any part of the hand. For example, the placement of the second linear slot 130 is far enough away from the first linear slot 124 such that the user's palm or the base of the thumb are unable to reach the second linear slot 130 during use of the controller 100, yet the slot 130 remains at a position where the fingers of the hand cannot easily wrap around the handle 104 to reach the second linear slot 130. FIG. 1 depicts a slider knob 132 (or push button) disposed within the second linear slot 130 and protruding from the outer surface of the handle 104 so that the slider knob 132 is accessible. In this way, the slider knob 132 can be actuated by a finger of the user's hand. The slider knob 132 may be moved, by the user, along the second linear slot 130. The slider knob 132 may be coupled to the anchor 128. For example, an adjustment mechanism with the slider knob 132 and the anchor 128 may include an internal portion disposed inside of the handle 104 that connects the slider knob 132 to the anchor 128. In this way, movement of the slider knob 132 along the second linear slot 130 causes movement of the internal portion of the adjustment mechanism within the handle 104, which causes movement of the anchor 128 along the first linear slot 124, which adjusts the first end 118 of the hand strap 106 in a linear fashion. FIG. 1 also illustrates markings 134 on the handle 104 (e.g., on a front of the handle 104) adjacent to the second linear slot 130. The markings 134 may indicate to the user that the first end 118 of the hand strap 106 is adjustable between a plurality of discrete positions. For example, the markings 134 may correspond to size adjustments for different hand sizes, such as extra small (XS), small (S), medium (M), large (L), and/or extra large (XL). In this example, the size adjustment for the largest hand size (e.g., XL) may correspond to the marking 134 that is closest to the distal end 122 (or the bottom) of the handle 104, while the size adjustment for the smallest hand size (e.g., XS) may correspond to the marking 134 that is farthest from the distal end 122 (or the bottom) of the handle 104.

FIG. 1 shows the hand strap 106 as being coupled to the anchor 128 at the proximal end 120 of the handle 104. The hand strap 106 may also be coupled to the distal end 122 of the handle 104. For example, the distal end 122 of the handle 104 may include an eyelet 136 to receive the second end 138 of the hand strap 106. As the user continues to pull the hand strap 106 through the eyelet 136, a first portion of the hand strap 106 passes through the eyelet 136 and the user may attach the first portion of the hand strap 106 to an outer surface of a second portion of the hand strap 106. In other words, the user may thread the second end 138 of the hand strap 106 through the eyelet 136 and loop the hand strap 106 around the eyelet 136 back onto itself in order to tighten and secure the hand strap 106. In this second way of adjusting the hand strap 106, the user may pull harder on the second end 138 of the hand strap 106 while securing the second end 138 of the hand strap 106 to the back side (outer surface) of the hand strap 106 in order to tighten the hand strap 106, or the user may release tension on the hand strap 106 in order to loosen the hand strap 106. That is, the hand strap 106 is configured to be tightened around the hand by the user pulling a first portion of the hand strap 106 around the eyelet 136 after passing that first portion of the hand strap 106 through the eyelet 136, and the hand strap 106 is configured to physically bias the palm of the user's hand against the outer surface of the handle 104 when the hand strap 106 is tightened around the hand in this manner. With the hand strap 106 tightened to the desired amount of tightness around the hand, and with the first end 118 of the hand strap 106 adjusted to a desired position longitudinally 126 along the handle 104, the hand strap 106 provides an ergonomic and functional portion of the controller 100 because the fingers of the user's hand consistently grasp the handle 104 at the same positions, allowing for efficiency and effectiveness of providing inputs to the controller (e.g., via the thumb-operated control(s) 110, 112(1), 112(2), via finger tracking, pressure sensing, etc.). Furthermore, the controller 100 is prevented from falling out of the user's hand notwithstanding the user releasing a grip on the handle 104. The adjustable nature of the hand strap 106 also means that a wide variety of types of users—ranging from small children to large adults—can use the controller 100 without sacrificing ergonomics, comfort, and functionality for any one of the user groups. In addition, the removable nature of the coupling between the hand strap 106 and the controller body 102 allows the user to replace the hand strap 106 with another hand strap 106 (e.g., if the hand strap 106 wears out from overuse, if the user wants to use a different hand strap 106, etc.), and/or to clean the hand strap 106 (e.g., if the hand strap 106 gets sweaty, smelly, and/or dirty).

It is to be appreciated that the hand strap 106 may be coupled to the controller body 102 in different ways. It is also to be appreciated that the hand strap 106 may be adjustable in different ways. For example, instead of an eyelet 136 at the distal end 122 of the handle 104, the hand strap 106 may include a draw cord that is cinched by a spring-biased chock at the distal end 122 of the handle 104. In another example, a cleat may be used to couple the hand strap 106 to the distal end 122 of the handle 104. In yet other examples, the hand strap 106 may be in the form of an elastic band (e.g., an elastic band that temporarily stretches when the hand is inserted), so that it applies elastic tension to press against the back of the hand.

Figure 2:
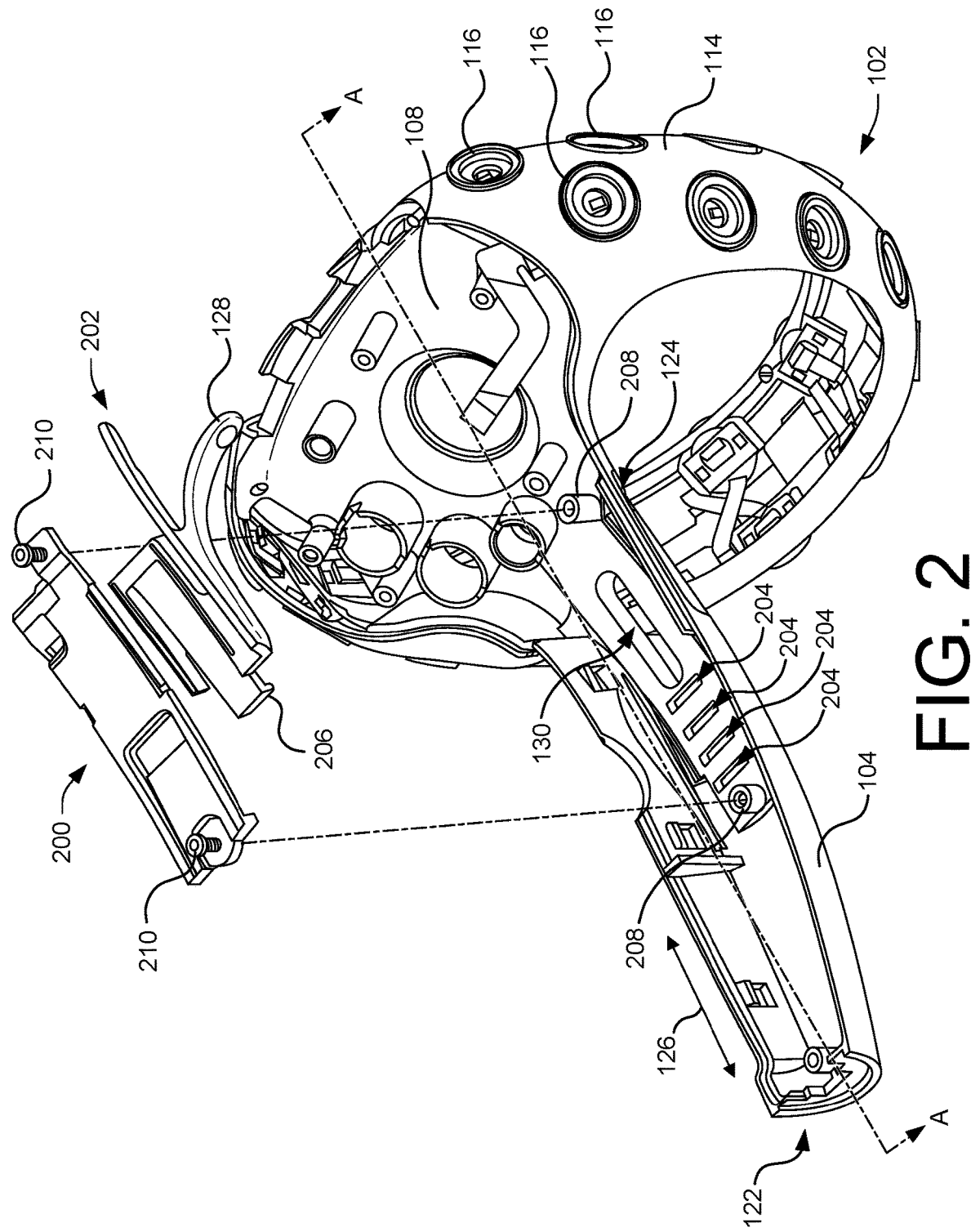
FIG. 2 illustrates a perspective exploded view of example components of a controller, the components including a support, an adjustment mechanism, and a front portion of a controller body.

FIG. 2 illustrates a perspective exploded view of example components of a controller 100, the components including a support 200, an adjustment mechanism 202, and a front portion of a controller body 102. The controller body 102 may be made of a substantially rigid material, such as hard plastic. In the example of FIG. 2, a substantial portion of the controller body 102, such as the front portion of the controller body 102 depicted in FIG. 2, may be molded together by a single injection-molding process step, resulting in one integral hard plastic component that comprises the tracking member 114, the head 108, and at least a portion of the handle 104. In the example of FIG. 2, a back portion of the controller body 102 (not shown in FIG. 2) may be fabricated separately, and then coupled to the front portion of the controller body 102 to enclose the support 200 and the adjustment mechanism 202 inside of the controller body 102 (e.g., within the handle 104).

The exploded view of FIG. 2 reveals the adjustment mechanism 202, which is internal to the controller body 102 when the controller 100 is assembled. As depicted in FIG. 2, the anchor 128 (introduced in FIG. 1) is part of the adjustment mechanism 202. Because the anchor 128 is configured to be disposed within the first linear slot 124 defined in the handle 104 and to protrude from the outer surface of the handle 104, the anchor 128 may be considered an external portion of the adjustment mechanism 202. The slider knob 132 depicted in FIG. 1, which is hidden from view in FIG. 2, may also be considered an external portion of the adjustment mechanism 202 because the slider knob 132 of the adjustment mechanism 202 is configured to be disposed within the second linear slot 130 defined in the handle 104 and to protrude from the outer surface of the handle 104. A remainder of the adjustment mechanism 202 other than the anchor 128 and the slider knob 132 may be considered an internal portion of the adjustment mechanism 202 because the internal portion is configured to be disposed inside of the controller body 102 when the controller 100 is assembled.

FIG. 2 further illustrates a plurality of detents 204 defined in an inner surface of the handle 104 (e.g., underneath the front of the handle 104). The plurality of detents 204 (or "ratcheted stops 204") may be arranged longitudinally 126 along the handle 104 to allow for moving the adjustment mechanism 202 between a plurality of discrete positions. Although FIG. 2 depicts detents 204 of equal size and uniform spacing, the detents 204 are not necessarily of equal size and do not necessarily have equal spacing between them. In the example of FIG. 2, the detents 204 are arranged in a single row (or column) running longitudinally 126 along the handle 104. Furthermore, although four detents 204 are shown in FIG. 2, other examples may implement fewer than four detents 204 (e.g., two detents 204) or more than four detents 204. In some examples, the detents 204 may correspond one-to-one with the markings 134. Although FIG. 1 illustrates three markings 134 while FIG. 2 illustrates four detents 204, the number of markings 134 may be equivalent to the number of detents 204. Accordingly, the detents 204 may correspond to size adjustments for adjusting the first end 118 of the hand strap 106 longitudinally 126 along the handle 104. For example, the size adjustments may range from extra-small (XS) or small (S) to large (L) or extra-large (XL). In this scenario, the detent 204 closest to the distal end 122 (or the bottom) of the handle 104 may correspond to a largest size adjustment (e.g., L or XL) while the detent 204 farthest from the distal end 122 may correspond to a smallest size adjustment (e.g., S or XS). The full range of adjustment from the detent 204 closest to the distal end 122 to the detent 204 farthest from the distal end 122 may be about 18 to 20 millimeters (mm). Furthermore, the detents 204 may be disposed below the second linear slot 130 defined in the front of the handle 104 at the proximal end 120 of the handle 104. In other words, an end of the second linear slot 130 that is closest to a distal end 122 of the handle 104 may be positioned a first distance from the distal end 122 of the handle 104 and an individual detent 204 may be positioned a second distance from the distal end 122 of the handle 104, the second distance being less than the first distance.

In the example of FIG. 2, the adjustment mechanism 202 further includes a tooth 206 configured to engage individual ones of the plurality of detents 204. The tooth 206 may be disposed at an end of the adjustment mechanism 202 (e.g., the bottom end that is closest to the distal end 122 of the handle 104) and may project from the adjustment mechanism 202 toward the front of the handle 104 in order to engage with an individual detent 204 defined in the inner surface of the handle 104 (e.g., underneath the front of the handle 104). The support 200 is configured to be mounted inside of the handle 104 and is configured to support the adjustment mechanism 202 within the handle 104. In this configuration, the adjustment mechanism 202 is interposed between the support 200 and the front of the handle 104 when the controller 100 is assembled. In the example of FIG. 2, mounting posts 208 project inward from the inner surface of the front of the handle 104 and are configured to receive fasteners for mounting the support 200 to the controller body 102. The support 200 may include apertures (or holes) to receive the fasteners 210 (e.g., screws) therethrough, and the fasteners 210 may be tightened by threading the fasteners 210 into the mounting posts 208, thereby mounting the support 200 to the controller body 102 with the adjustment mechanism 202 interposed between the support 200 and the front of the handle 104.

Figure 3A:
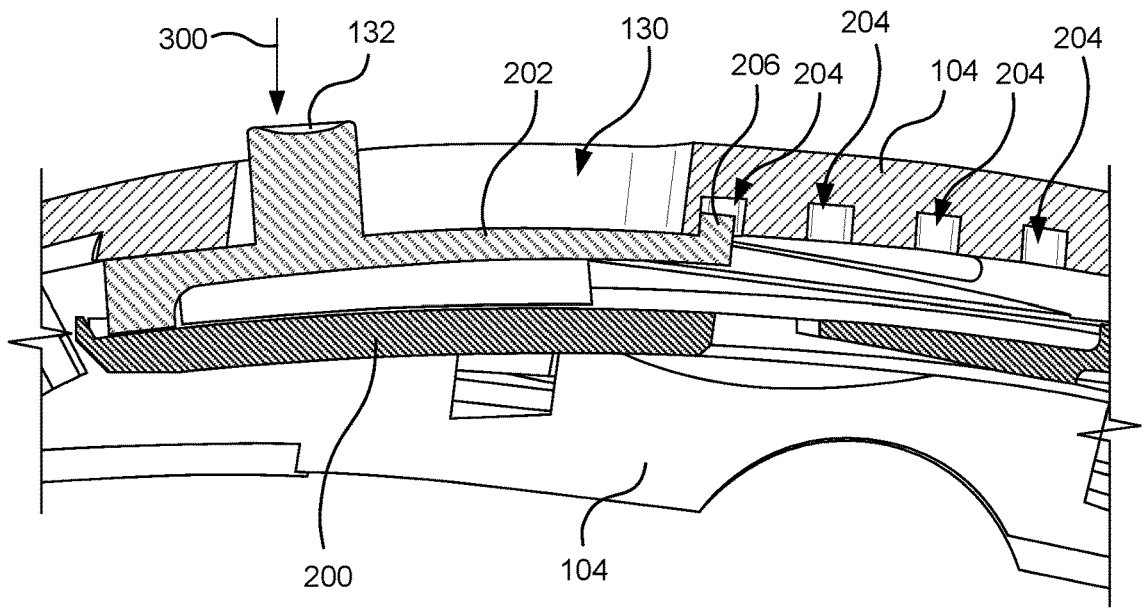
FIG. 3A illustrates a cross-sectional view of the components depicted in FIG. 2 when the components are assembled, and when the adjustment mechanism is in a first adjusted position.
Figure 3B:
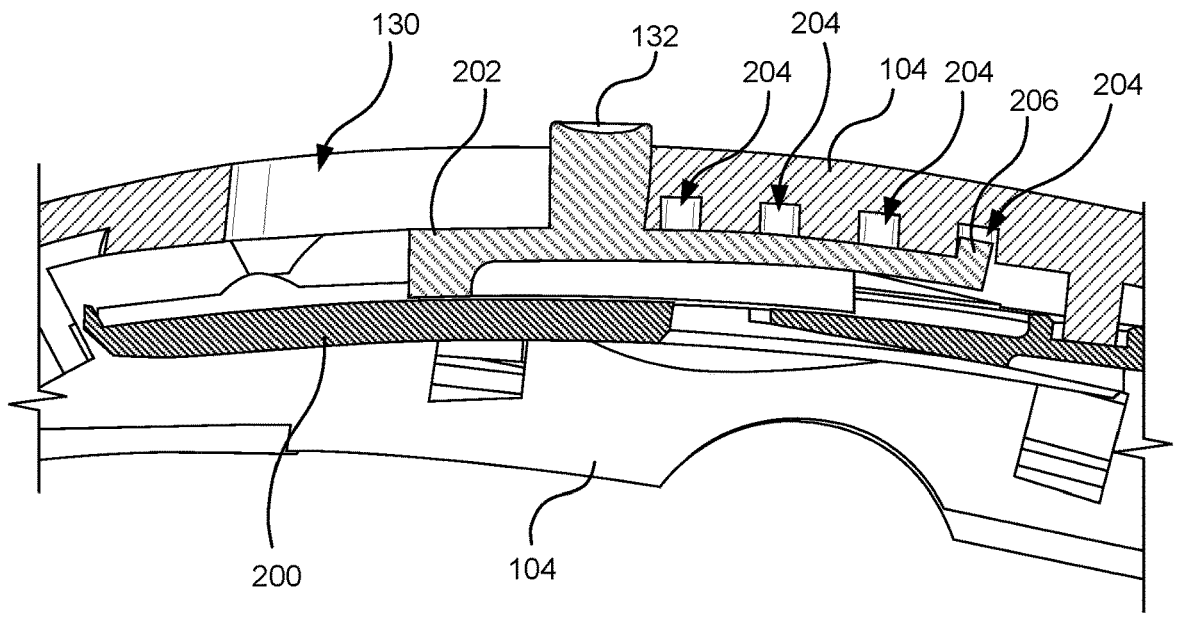
FIG. 3B illustrates the cross-sectional view of FIG. 3A with the adjustment mechanism in a second adjusted position that is different than the first adjusted position depicted in FIG. 3A.

FIGS. 3A and 3B illustrate a cross-sectional view of the components depicted in FIG. 2 taken along section line A-A of FIG. 2 when the components are assembled. FIG. 3A shows the components when the adjustment mechanism 202 is in a first adjusted position. FIG. 3B shows the components when the adjustment mechanism 202 is in a second adjusted position that is different than the first adjusted position depicted in FIG. 3A. FIGS. 3A and 3B illustrate the adjustment mechanism 202 as having the slider knob 132. FIGS. 3A and 3B also illustrate how the adjustment mechanism 202 is movable between a plurality of discrete positions by the user moving the slider knob 132 along the second linear slot 130. For example, the user may depress (e.g., press down upon) the slider knob 132 in the direction shown by arrow 300 in FIG. 3A. The depression of the slider knob 132 disengages the tooth 206 from a first detent 204 of the plurality of detents 204. With the tooth 206 disengaged from the first detent 204, the user may then move the slider knob 132 along the second linear slot 130 while the slider knob 132 is depressed and until the tooth 206 is aligned with a second detent 204 of the plurality of detents 204, and then the user may release the slider knob 132 (e.g., cease depressing or applying pressure to the slider knob 132) to engage the tooth 206 with the second detent 204. The adjustment mechanism 202 may be made of a resilient material (e.g., plastic, steel spring, etc.) that allows the tooth 206 to disengage from a detent 204 (with which the tooth 206 is currently engaged) upon the user depressing the slider knob 132. The resilient material of the adjustment mechanism 202 is further configured to bias the tooth 206 into engagement with the a particular detent 204 upon the user releasing the slider knob 132. For example, the internal portion of the adjustment mechanism 202 may act as a "spring board" when the user presses down upon the slider knob 132, causing the tooth 206 to move away from a detent 204 (with which the tooth 206 is currently engaged), and causing the tooth 206 to spring back into engagement with a particular detent 204 when pressure is released from the slider knob 132. During this adjustment, the user may feel and/or hear a "click" type of feedback as the adjustment mechanism 202 is adjusted along the second linear slot 130 to the desired position. The engagement of the tooth 206 with a particular detent 204 effectively "locks" the adjustment mechanism 202 into position and prevents translational movement of the adjustment mechanism 202 within the handle 104, which prevents the first end 118 of the hand strap 106 from moving longitudinally 126 along the handle 104 during use of the controller 100.

It is to be appreciated that linear adjustment of the hand strap 106 may be implemented in other ways. For example, the anchor 128 may be movable along the first linear slot 124 and held in place by friction between the adjustment mechanism 202 and the inside of the handle 104. For example, the adjustment mechanism 202 may be press fit within the handle 104 such that the force of friction between the adjustment mechanism 202 and the handle 104 is sufficient for keeping the adjustment mechanism 202 from moving during use of the controller 100. In this alternative example, the user can manipulate the first end 118 of the hand strap 106 and/or the anchor 128 by applying a greater amount of force to overcome the force of friction to adjust the first end 118 of the hand strap 106 along the first linear slot 124. In this example, the second linear slot 130 may be omitted, and the adjustment mechanism 202 may not include the slider knob 132 or the tooth 206.

FIG. 4A illustrates a plan view of an outer surface of the hand strap 106. FIG. 4B illustrates a plan view of an inner surface of the hand strap 106. The inner surface of the hand strap 106 shown in FIG. 4B is configured to contact a back of the hand of the user when the hand strap 106 is tightened around the hand. The hand strap 106 is shown as having a first portion 400 and a second portion 402. As described elsewhere herein, the a first portion 400 of the hand strap 106 is configured to be passed through the eyelet 136 at the distal end 122 of the handle 104 and then attached to the outer surface of the second portion 402 of the hand strap 106. FIG. 4A shows the outer surface of the second portion 402 of the hand strap 106 as having areas 404 of "hook-type" fasteners (e.g., Velcro®). The outer surface of the first portion 400 of the hand strap 106 may include fabric, such as a cotton, polyester, or the like, which, when pressed upon the area(s) 404, attach the first portion 400 of the hand strap 106 to the outer surface of the second portion 402 of the hand strap 106. FIG. 4B illustrates that the inner surface of the second portion 402 of the hand strap 106 may include padding 408 (or cushioning), such as foam padding. Because the inner surface of the second portion 402 of the hand strap 106 is configured to contact a back of the user's hand, the padding 408 may provide added comfort for the user while using the controller 100 for extended periods of time.

FIGS. 5A-5B illustrate example operations that can be performed to couple the first end 118 of the hand strap 106 to the anchor 128. It is to be appreciated that the operations of FIGS. 5A-5B can be performed in the reverse order to decouple the first end 118 of the hand strap 106 from the anchor 128, which may be useful in removing the hand strap 106 to replace the hand strap 106, to clean the hand strap 106, or the like. In FIGS. 5A-5B, a user may insert the anchor 128 into a cavity 500 of an anchor attachment mechanism 502 at the first end 118 of a hand strap 106. A hole 504 may be defined in the anchor attachment mechanism 502 such that the cavity 500 is accessible via the hole 504. Another hole 506 may be defined in the anchor 128. The holes 504 and 506 may be of a similar size (e.g., diameter). As shown in FIG. 5B, after insertion of the anchor 128 into the cavity 500 of the anchor attachment mechanism 502, the holes 504 and 506 may be aligned with each other. A fastener 508 may be inserted into the aligned holes 504 and 506 and used to couple (e.g., fasten) the first end 118 of the hand strap 106 to the anchor 128. In some examples, the hole 506 and/or the hole 504 is threaded (e.g., with female threads) to enable the fastener 508 (e.g., a screw with male threads) to be secured to the anchor 128.

Figure 5D:
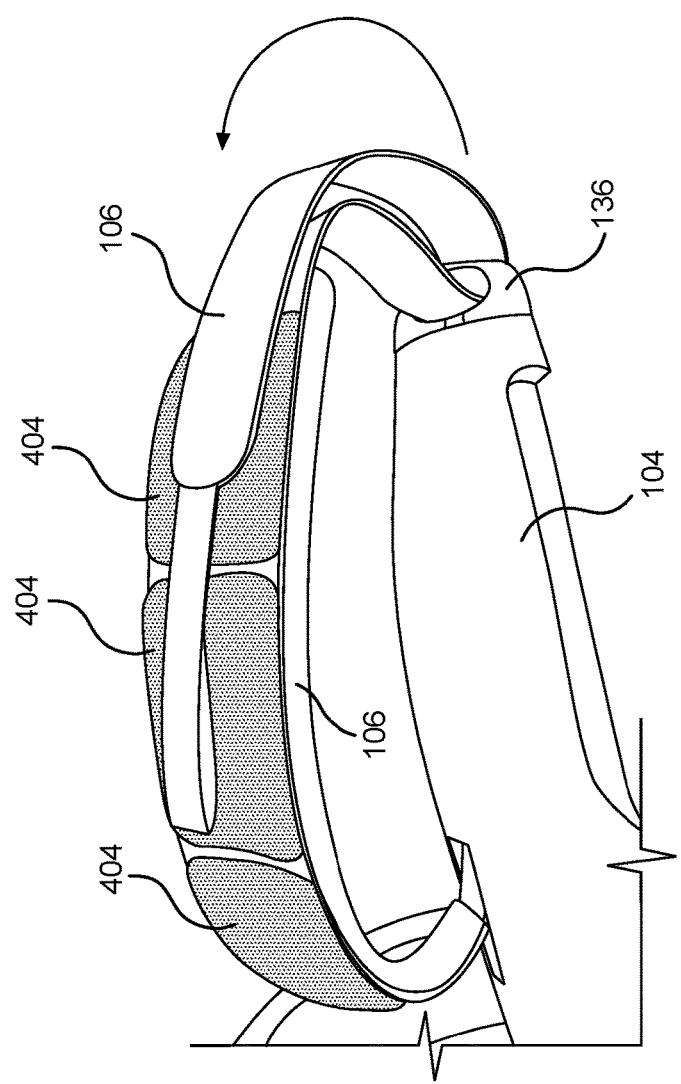
FIG. 5D illustrates an operation of pulling the first portion of the hand strap around the eyelet and attaching the first portion of the hand strap to an outer surface of a second portion of the hand strap.
Figure 5C:
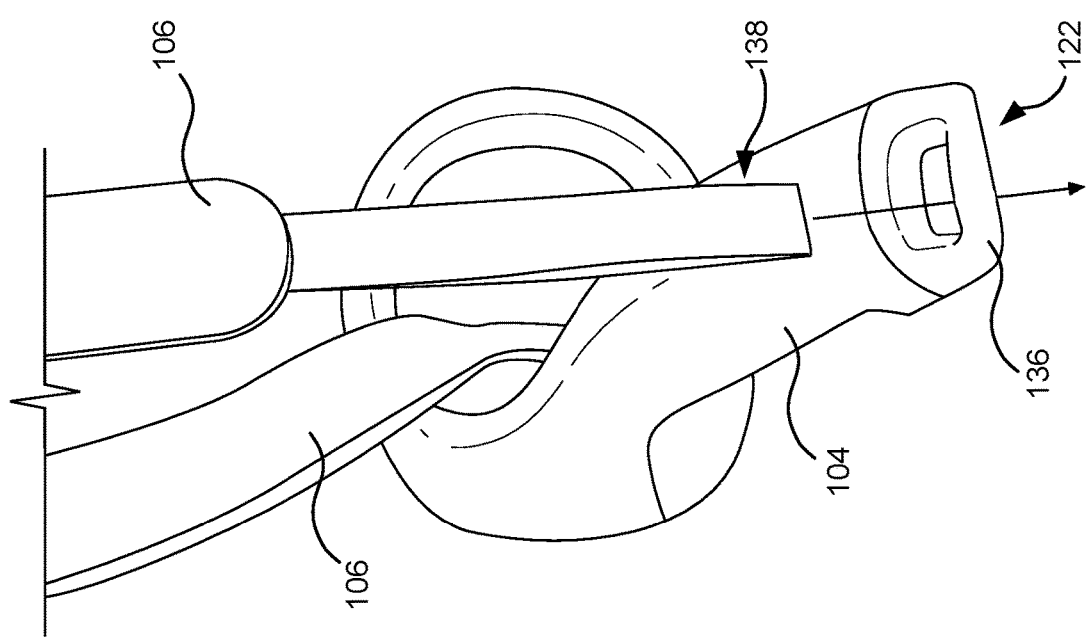
FIG. 5C illustrates an operation of passing a first portion of the hand strap through an eyelet at a distal end of the handle of the controller body.

FIGS. 5C-5D illustrate example operations that can be performed to couple the hand strap 106 to the distal end 122 of the handle 104. In FIG. 5C, the second end 138 of the hand strap 106 may be passed through the eyelet 136 at the distal end 122 of the handle 104. The user may then grab the second end 138 of the hand strap 106 from the other side of the eyelet 136 and pull the hand strap 106 further through the eyelet 136 to continue passing the first portion 400 (See FIGS. 4A-4B) of the hand strap 106 through the eyelet 136. FIG. 5D illustrates how the first portion 400 of the hand strap 106 may be pulled (or wrapped) around the eyelet 136 and attached to an outer surface of a second portion 402 (See FIGS. 4A-4B) of the hand strap 106. The user may pull the hand strap 106 with as much force (or tension) as desired to tighten the hand strap 106 at a desired tightness. If adjustment is desired, the user may detach the first portion 400 of the hand strap 106 from the outer surface of the second portion 402 of the hand strap 106 and loosen or tighten the hand strap 106 by pulling the hand strap 106 through the eyelet 136 in either direction before reattaching the first portion 400 of the hand strap 106 to the outer surface of the second portion 402 of the hand strap 106.

Figure 6:
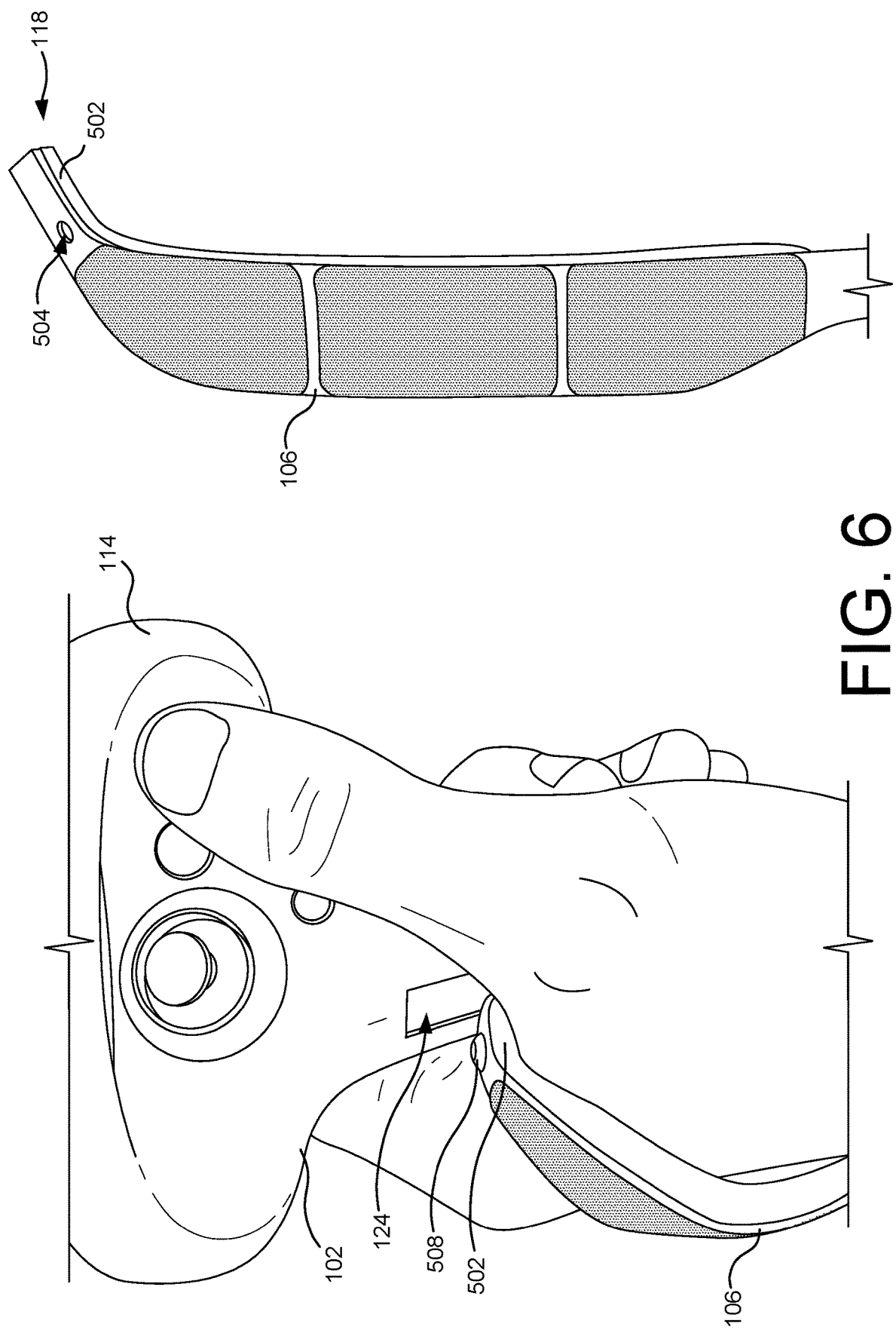
FIG. 6 illustrates an example anchor attachment mechanism at the first end of the hand strap.

FIG. 6 illustrates the example anchor attachment mechanism 502 at the first end 118 of the hand strap 106. The anchor attachment mechanism 502 is configured to be removably coupled to the anchor 128 in order to couple the first end 118 of the hand strap 106 to the controller body 102. For example, as described above with reference to FIGS. 5A-5B, the anchor 128 may be inserted into a cavity 500 (See FIG. 5A) of the anchor attachment mechanism 502 until the hole 506 (See FIG. 5A) of the anchor 128 is aligned with the hole 504 defined in the top of the anchor attachment mechanism 502. With the holes 504 and 506 aligned, a fastener 508 may be inserted into the aligned holes 504 and 506 and used to couple the first end 118 of the hand strap 106 to the anchor 128. With the first end 118 of the hand strap 106 coupled to the anchor 128, the user may cause the anchor 128 to move along the first linear slot 124 to adjust the first end 118 of the hand strap 106 (e.g., towards or away from the distal end 122 of the handle 104). When the user is holding the controller 100, as depicted in FIG. 6, this adjustment of the first end 118 of the hand strap 106 may adjust the first end 118 of the hand strap 106 towards or away from the purlicue of the user's hand. When the user is about to use the controller 100, and when the slider knob 132 is positioned at the top of the second linear slot 130, the user may insert his/her fingers through the space between the hand strap 106 and the handle 104 and may grip the handle 104 at a desired position on the handle 104 such that the thumb can reach the thumb-operated control(s) 110, 112(1), 112(2). The user may then adjust the first end 118 of the hand strap 106 until the first end 118 is snug against the purlicue of the hand by sliding the slider knob 132 along the second linear slot 130 downward (i.e., towards the distal end 122 of the handle 104). Alternatively, if the user already knows the desired adjusted position, the user may adjust the slider knob 132 to the desired position along the second linear slot 130 and then insert his/her fingers through the space between the hand strap 106 and the handle 104 to grip the handle 104 as shown in FIG. 6. The user may then tighten the hand strap 106 around the back of the hand, as described herein (See e.g., FIGS. 5C-5D).

Figure 7A:
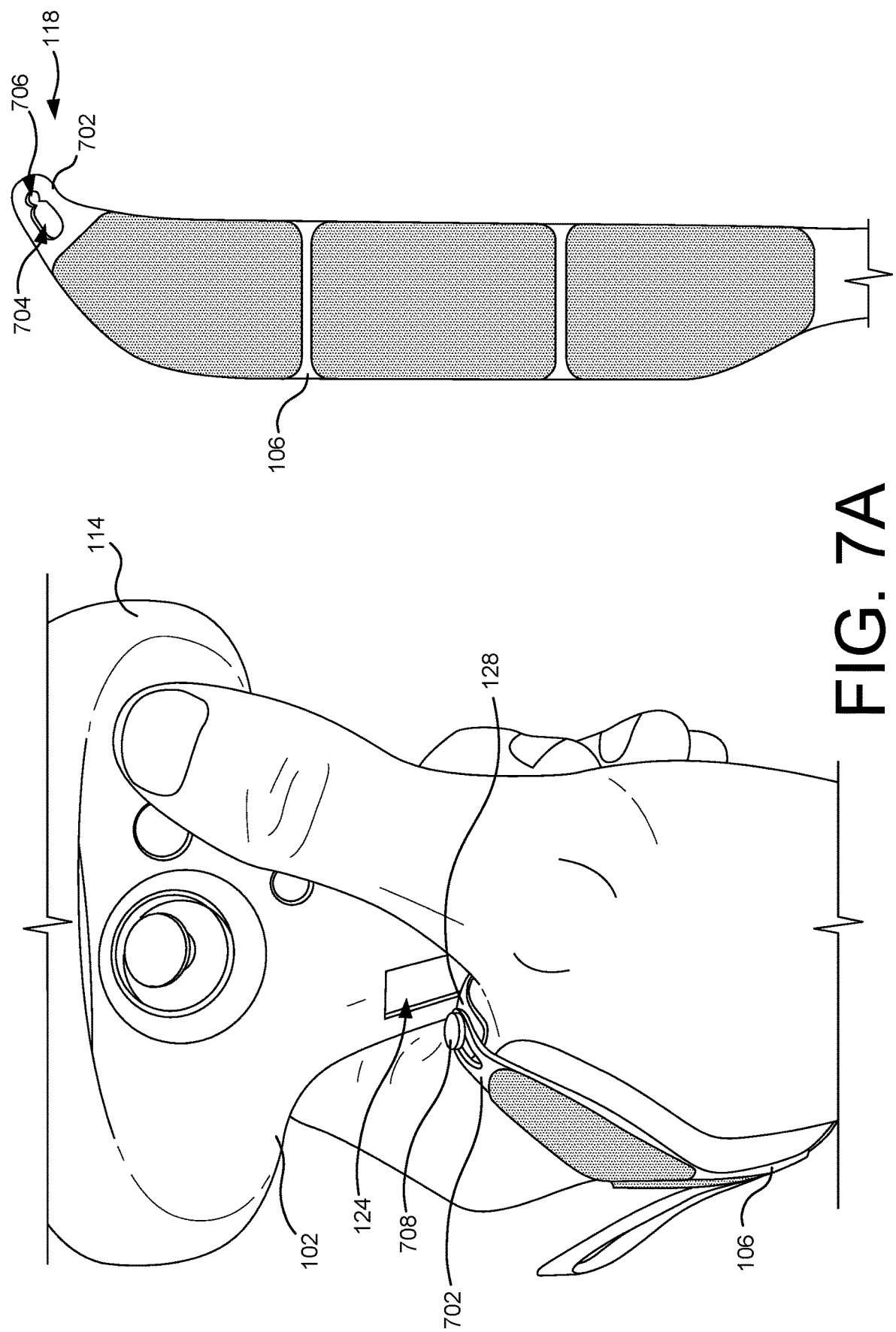
FIG. 7A illustrates another example anchor attachment mechanism at the first end of the hand strap.
Figure 7B:
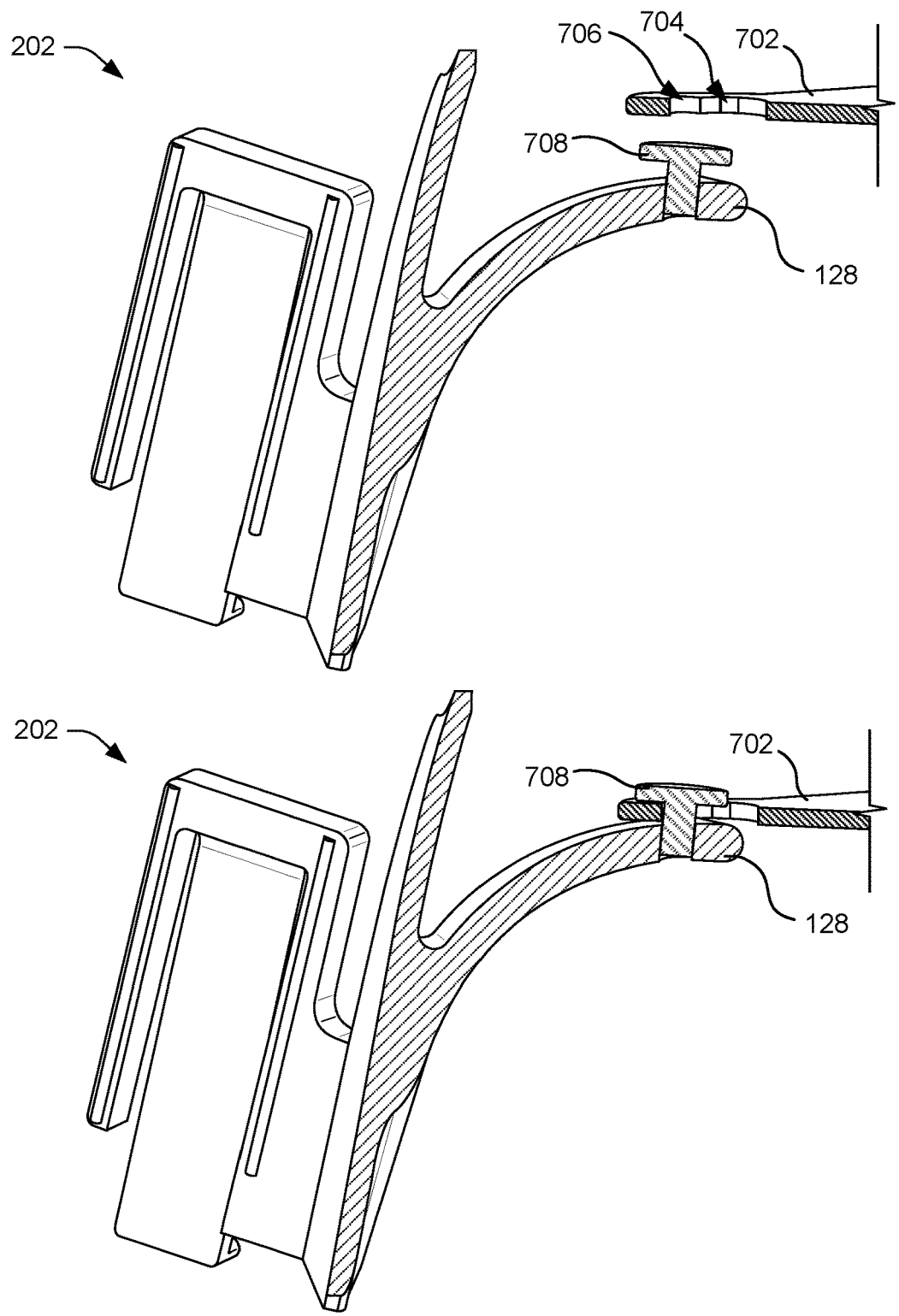
FIG. 7B illustrates cross-sectional views of the example anchor attachment mechanism of FIG. 7A.

FIGS. 7A-7B illustrate another example anchor attachment mechanism 702 at the first end 118 of the hand strap 106. The anchor attachment mechanism 702 is configured to be removably coupled to the anchor 128 in order to couple the first end 118 of the hand strap 106 to the controller body 102. In the example of FIGS. 7A-7B, the anchor 128 includes a post 708 (or a cleat) protruding from the anchor 128. A through hole 704 is defined in the anchor attachment mechanism 702 so that the anchor attachment mechanism 702 can be hooked (or looped) over the post 708 of the anchor 128. The through hole 704 may include a feature, such as a locking portion 706, to secure the first end 118 of the hand strap 106 to the anchor 128 and to prevent the hand strap 106 from decoupling from the anchor 128 during use of the controller 100. For example, the locking portion 706 may be a portion of the through hole 704 with a diameter that is less than a diameter of a cap on the post 708. FIG. 7B illustrates cross-sectional views of the example anchor attachment mechanism 702 depicted in FIG. 7A. FIG. 7B also illustrates the anchor attachment mechanism 702 as it is being attached to the anchor 128 of the adjustment mechanism 202. FIG. 7B shows how the anchor attachment mechanism 702 can be hooked (or looped) over a post 708 of the anchor 128 by inserting the post 708 through the through hole 704, and then pulling on the anchor attachment mechanism 702 until the post 708 is disposed within the locking portion 706 of the through hole 704.

Figure 8:
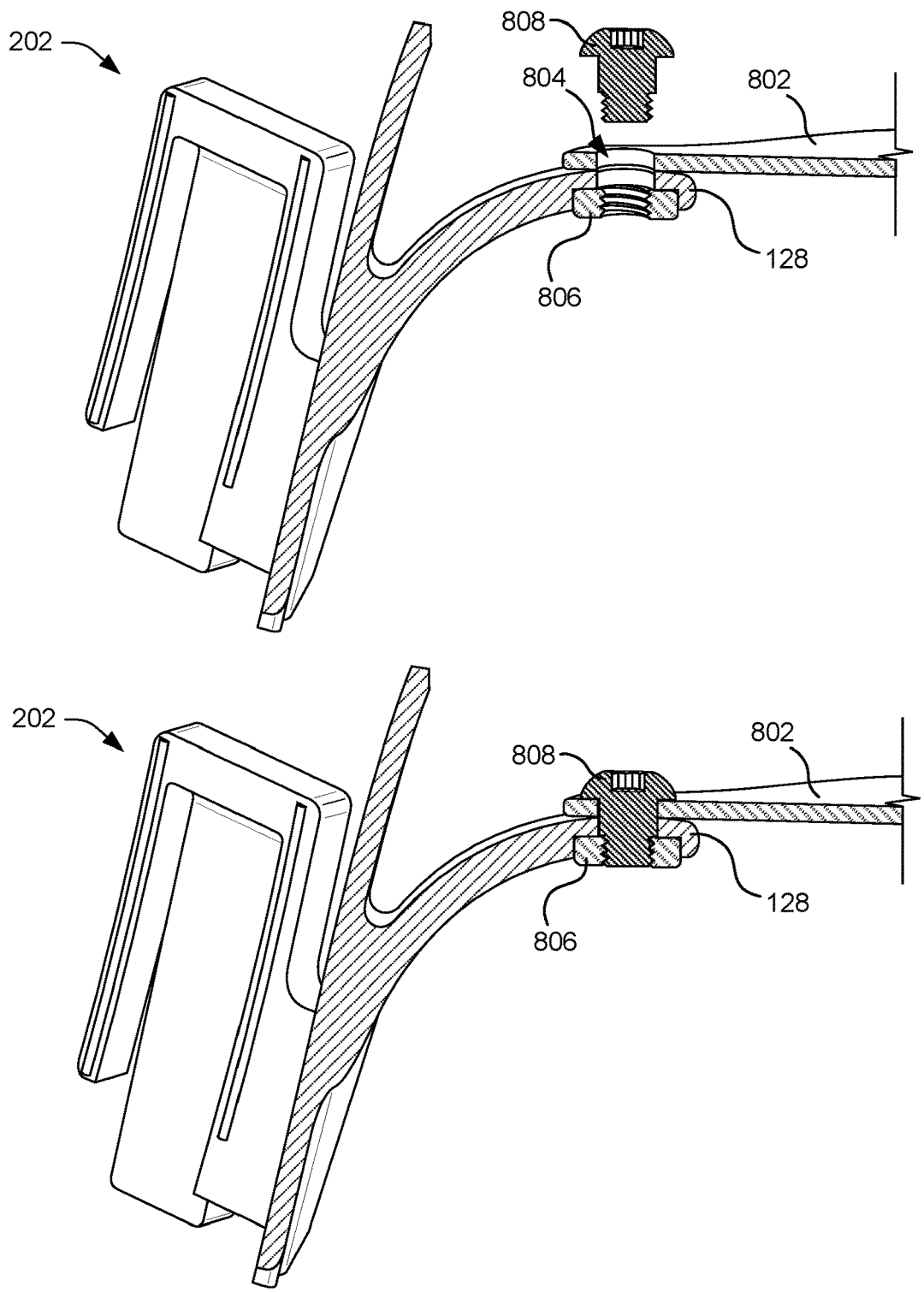
FIG. 8 illustrates cross-sectional views of another example anchor attachment mechanism at an end of the hand strap.

FIG. 8 illustrates cross-sectional views of another example anchor attachment mechanism 802 at the first end 118 of the hand strap 106. FIG. 8 also illustrates the anchor attachment mechanism 802 as it is being attached to the anchor 128 of the adjustment mechanism 202. The anchor attachment mechanism 802 is configured to be removably coupled to the anchor 128 in order to couple the first end 118 of the hand strap 106 to the controller body 102. In the example of FIG. 8, the anchor 128 includes a captive nut 806 (or an embedded nut) in the bottom of the anchor 128. A through hole 804 is defined in the anchor attachment mechanism 802. The through hole 804 may be aligned with the hole 506 of the anchor 128, and then a fastener 808 can be inserted through the aligned holes 804 and 506 and fastened to the captive nut 806. For example, the fastener 808 may include threads (e.g., male threads) that are threaded into corresponding threads (e.g., female threads) of the captive nut 806.

Figure 9:
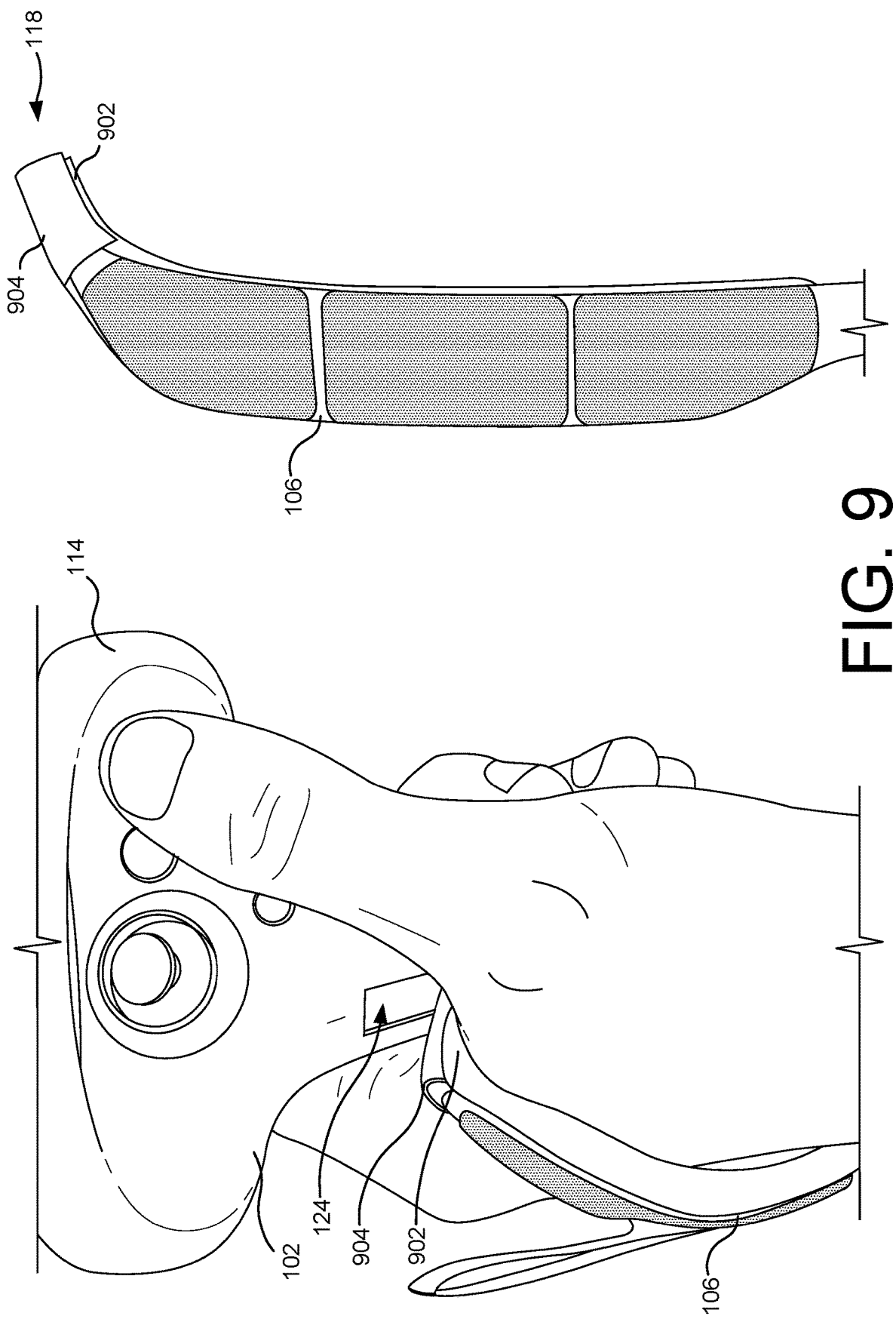
FIG. 9 illustrates another example anchor attachment mechanism at the first end of the hand strap.

FIG. 9 illustrates another example anchor attachment mechanism 902 at the first end 118 of the hand strap 106. The anchor attachment mechanism 902 is configured to be removably coupled to the anchor 128 in order to couple the first end 118 of the hand strap 106 to the controller body 102. In some examples, the anchor attachment mechanism 902 may be similar to the anchor attachment mechanism 502 described herein with respect to FIGS. 5A, 5B, and 6, except that a cover 904 of fabric may be configured to cover the hole 504, as well as the fastener 508 (See e.g., FIG. 6) when the anchor attachment mechanism 902 is attached to the anchor 128. This cover 904 of fabric may be stretched in order to access the fastener 508 for fastening or unfastening the fastener 508.

Figure 10:
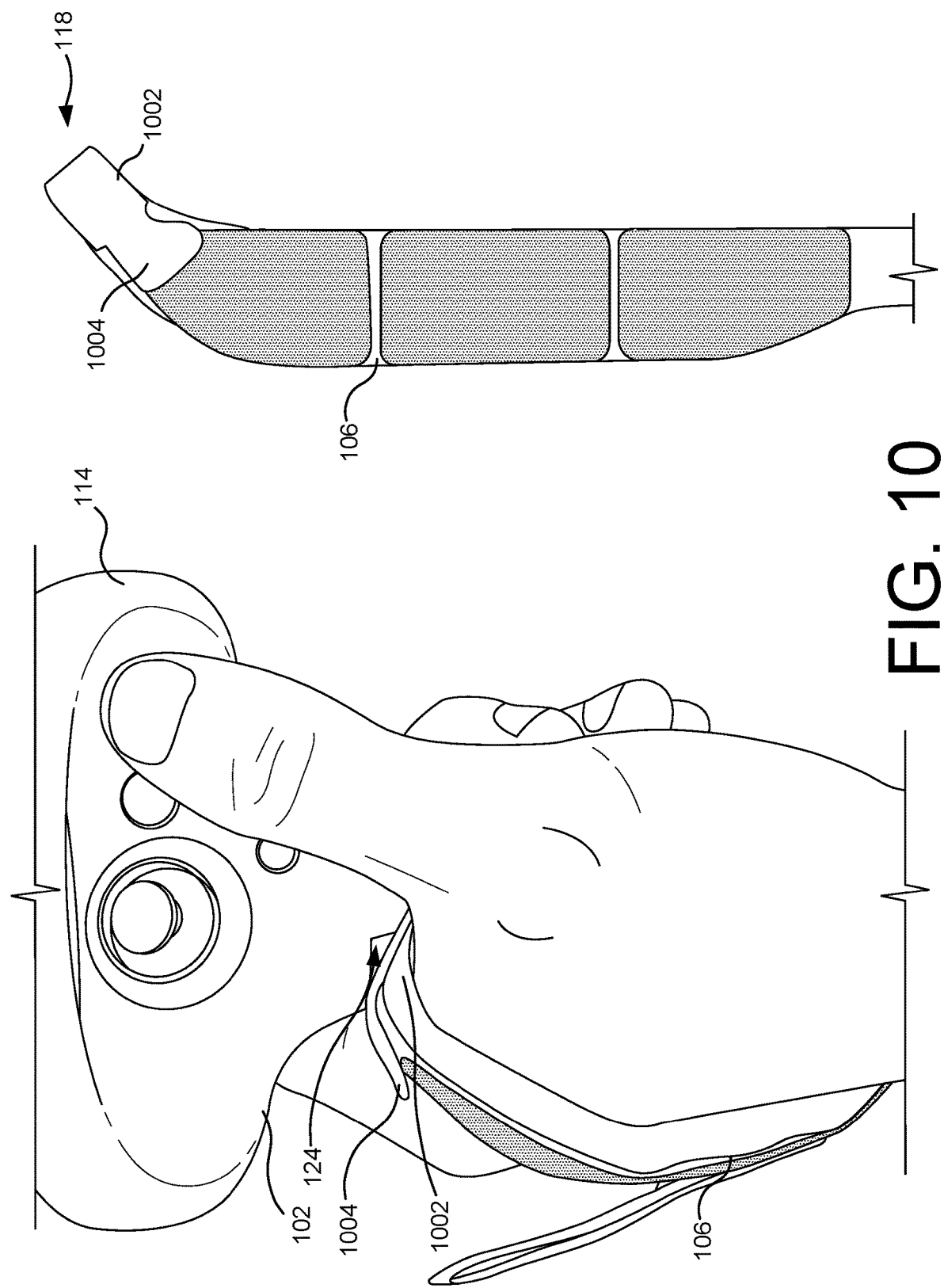
FIG. 10 illustrates another example anchor attachment mechanism at the first end of the hand strap.

FIG. 10 illustrates another example anchor attachment mechanism 1002 at an end of the hand strap 106. The anchor attachment mechanism 1002 is configured to be removably coupled to the anchor 128 in order to couple the first end 118 of the hand strap 106 to the controller body 102. In some examples, the anchor attachment mechanism 1002 may be similar to the anchor attachment mechanism 502 described herein with respect to FIGS. 5A, 5B, and 6, except that a flap 1004 of fabric may be configured to cover the hole 504, as well as the fastener 508 (See e.g., FIG. 6) when the anchor attachment mechanism 1002 is attached to the anchor 128. This flap 1004 of fabric may be fastened to an outer surface of the hand strap 106 (e.g., via hook-and-loop fasteners), and may be unfastened by lifting up the flap 1004 to access the fastener 508 for fastening or unfastening the fastener 508. The flap 1004 may allow for ease of access to the fastener 508.

The processes described herein are illustrated as collections of blocks in logical flow diagrams, which represent a sequence of operations. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

Figure 11:
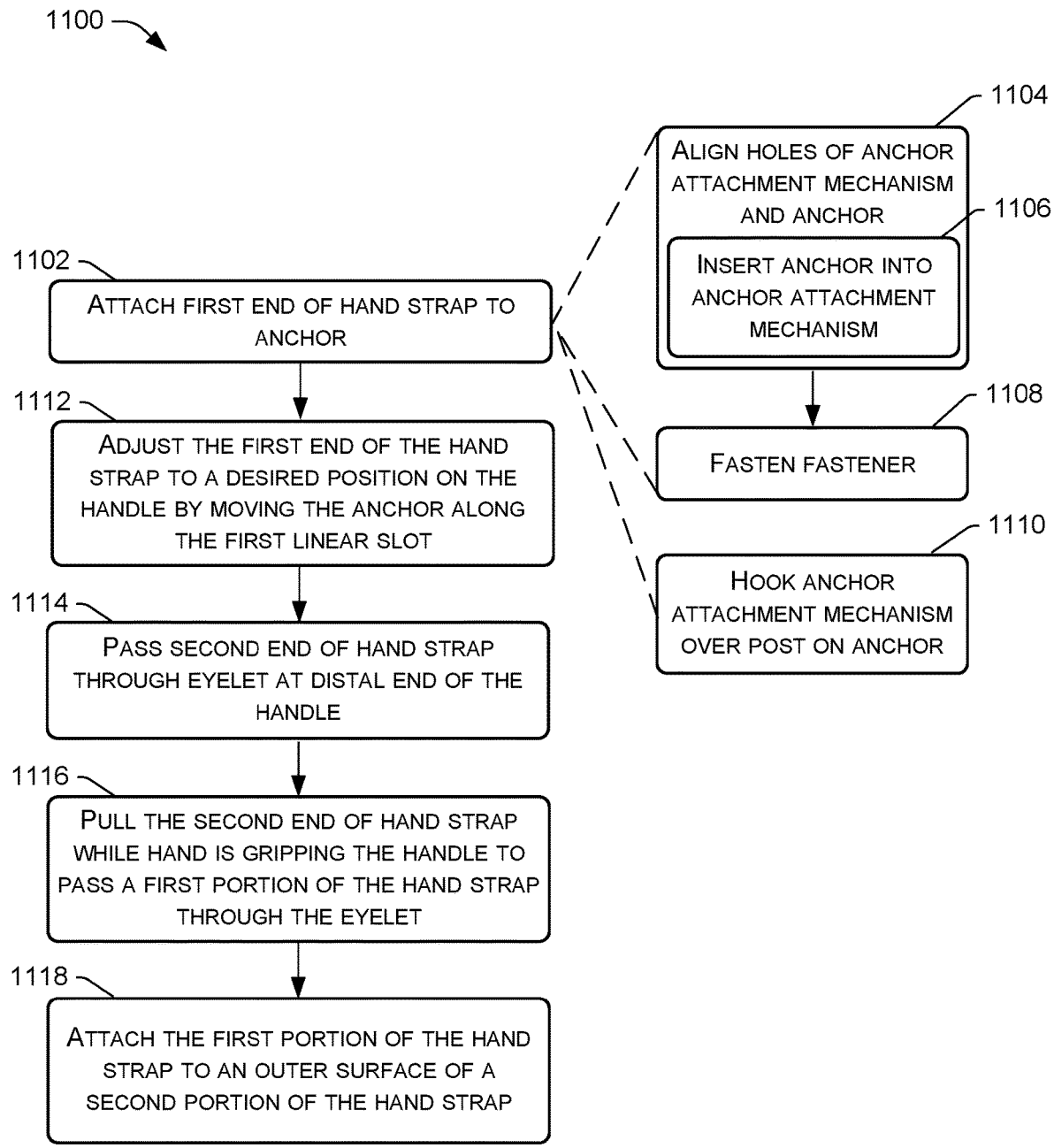
FIG. 11 illustrates a flow diagram of an example process for attaching the hand strap to the controller body of the controller and for adjusting the hand strap.

FIG. 11 depicts an example process 1100 for attaching the hand strap 106 to the controller body 102 of the controller 100, and for adjusting the hand strap 106. For discussion purposes, the process 1100 is described with reference to the previous figures.

At 1102, a first end 118 of the hand strap 106 may be attached to an anchor 128 disposed within a linear slot 124 defined in the handle 104 of the controller body 102 at a proximal end 120 (or the top) of the handle 104 where the handle 104 adjoins the head 108 of the controller body 102. Depending on the type of anchor attachment mechanism at the first end 118 of the hand strap 106, the attachment operation at block 1102 may be performed in various ways. For example, at 1104, a first hole 504, 804 defined in the anchor attachment mechanism 502, 802 disposed at the first end 118 of the hand strap 106 may be aligned with a second hole 506 defined in the anchor 128. At 1106, this hole-alignment operation may include inserting the anchor 128 into a cavity 500 defined in the anchor attachment mechanism 502 until the hole 506 of the anchor 128 is aligned with a hole 504 of the anchor attachment mechanism 502. At 1108, a fastener may be inserted within the aligned holes 506 and 504, 804 to fasten the anchor attachment mechanism 502, 802 to the anchor 128, which, in turn, couples the first end 118 of the hand strap 106 to the anchor 128. For example, the hole 506 and/or the hole 504 may be threaded and the fastener 508 may be threaded so that the fastener 508 can be threaded into the hole 504 and/or 506. As another example, a captive nut 806 embedded in an underside of the anchor 128 may be threaded and may receive a threaded fastener 808 to fasten the anchor attachment mechanism 802 to the anchor 128. At 1110, as an alternative example, the anchor attachment mechanism 702 at the first end 118 of the hand strap 106 may be hooked (or looped) over a post 708 protruding from a top of the anchor 128. It is to be appreciated that the first end 118 of the hand strap 106 may already be attached to the anchor 128 when the controller 100 is purchases, and, in this scenario, block 1102 may be omitted from the process 1100.

At 1112, the first end 118 of the hand strap 106 may be adjusted to a desired position on the handle 104 by moving the anchor 128 along the first linear slot 124. For example, a user with a larger hand may grip the handle 104 lower on the handle 104 (e.g., closer to the distal end 122, or bottom, of the handle 104) so that the thumb is properly positioned over the thumb-operated control(s) 110, 112(1), 112(2). A user with a smaller hand may grip the handle 104 higher on the handle 104 (e.g., closer to the proximal end 120, or top, of the handle 104) so that the thumb can reach the thumb-operated control(s) 110, 112(1), 112(2). In either case, the user may adjust the first end 118 by, for example, moving the slider knob 132 along the second linear slot 130 to a desired position, which causes movement of the internal portion of the adjustment mechanism 202 within the handle 104, which, in turn, causes movement of the anchor 128 along the first linear slot 124 to adjust the first end 118 of the hand strap 106 longitudinally 126 along the handle 104. To keep the palm from substantially moving relative to the handle 104 during use of the controller 100, the user may move the slider knob 132 downward (e.g., towards the distal end 122, or bottom, of the handle 104) along the second linear slot 130 until the first end 118 is adjusted to a position where it contacts the purlicue of the hand and is snug against the hand. The user may already know the desired position of the slider knob 132, in which case the user can adjust the first end 118 of the hand strap 106 at block 1112 without grasping the handle 104. If the user wants to determine the best position of the slider knob 132, the user may adjust the first end 118 of the hand strap 106 at block 1112 while the user grips the handle 104 with a first hand (e.g., a left hand for a left-handed controller 100). In some cases, such as when the controller 100 is used by a single user, the first end 118 of the hand strap 106 may already be adjusted to a desired position when the controller 100 is picked up for use, in which case, block 1112 may be omitted from the process 1100.

At 1114, the second end 138 of the hand strap 106 may be passed (or looped) through an eyelet 136 disposed at the distal end 122 of the handle 104. This may be done using a second hand (i.e., the opposite hand to the hand which may be gripping the handle 104). In some cases, the hand strap 106 may already be looped through the eyelet 136 when the controller 100 is picked up for use, in which case, block 1114 may be omitted from the process 1100.

At 1116, the second end 138 of the hand strap 106 may be pulled while the hand is gripping the handle 104 to pass the first portion 400 of the hand strap 106 through the eyelet 136 until an inner surface of a second portion 402 of the hand strap 106 comes into contact with a back of the hand. This tightens the hand strap 106 around the back of the hand that is gripping the handle 104, and the user may pull harder to tighten the hand strap 106 with more tension, as desired.

At 1118, the first portion 400 of the hand strap 106 may be attached to an outer surface of a second portion 402 of the hand strap 106. For example, a hook-and-loop fastening mechanism, such as Velcro®, may be utilized such that fabric on the outer surface of the first portion 400 may couple to an area(s) 404 of hook-type fasteners disposed on the outer surface of the second portion 402 of the hand strap 106. At this point, the controller 100 is ready to use, the thumb is optimally positioned over the thumb-operated control(s) 110, 112(1), 112(2), finger tracking is optimized, and the controller 100 is not at risk of falling out of the user's hand, even if the user releases his/her grip on the handle 104.

Figure 12:
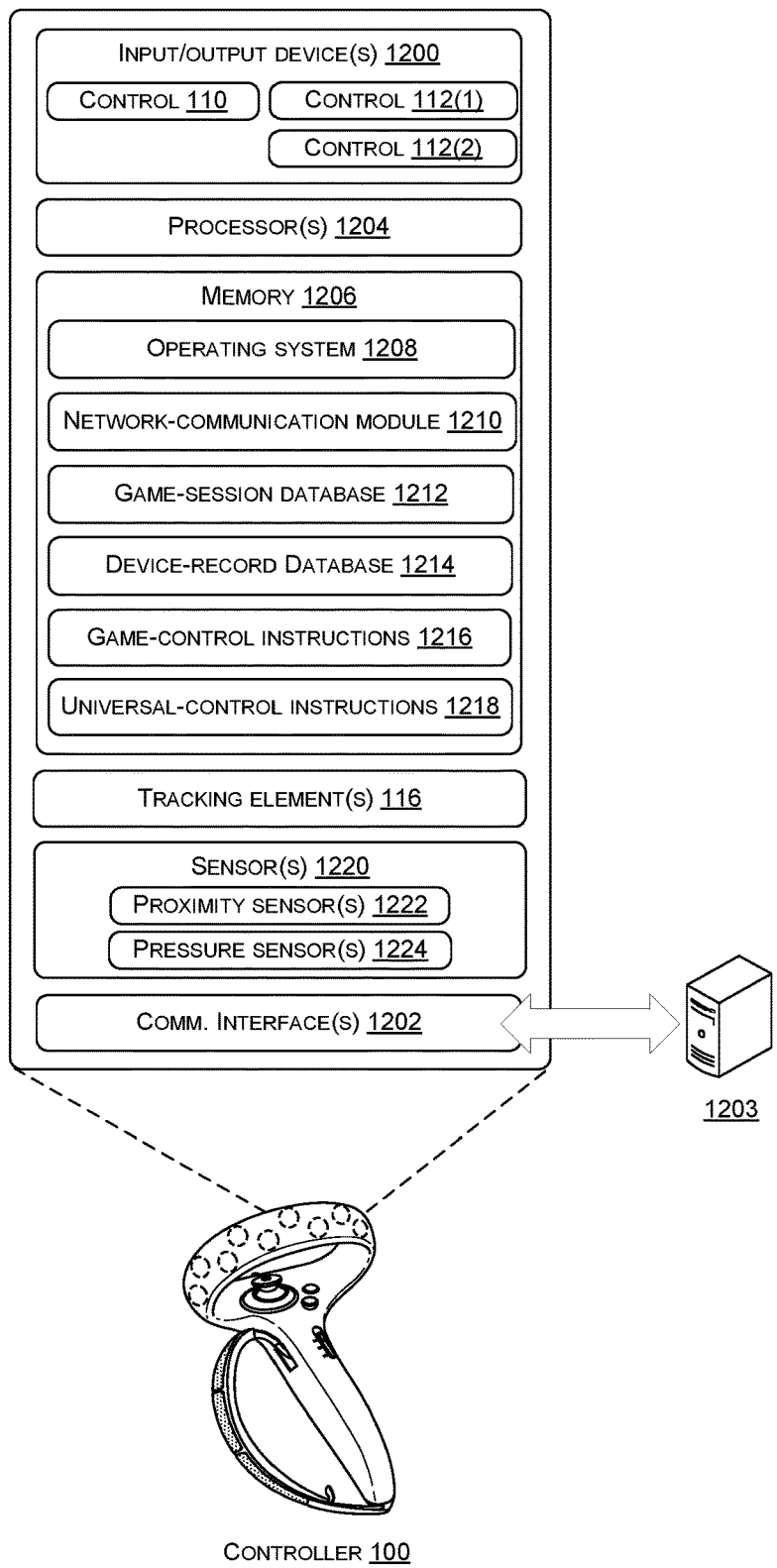
FIG. 12 illustrates example software and hardware components of the controller disclosed herein.

FIG. 12 depicts example components of a controller 100, according to an example embodiment of the present disclosure. The controller 100 may include one or more input/output (I/O) devices 1200, such as the thumb-operated controls 110 (e.g., joystick(s)), 112(1), 112(2) (e.g., depressible buttons) depicted in FIG. 1. Although three example thumb-operated controls 110, 112(1), and 112(2) are depicted, the controller 100 may include a single thumb-operated control, two thumb-operated controls, or more than three thumb-operated controls. Regardless of the number of thumb-operated controls, the thumb-operated controls may be positioned on the head 108 within a threshold distance from one another to allow a user's thumb to reach all of the controls with the thumb while the palm of the user's hand does not move relative to the controller 100. Furthermore, although example types of thumb-operated controls are shown in FIG. 1, the controller 100 may include any suitable type of thumb-operated control, such as a trackpad, a tilting button, a knob, a wheel, trackball, and/or any other type of input or output devices or any other suitable type of control that may be conveniently manipulated by a user's thumb during normal operation while the controller 100 is held in the hand of the user. In addition to thumb-operated controls, the controller 100 may include one or more finger-operated controls, such as a trigger disposed on a back of the handle 104 and operable by the index finger. As another example, the I/O devices 1200 may include one or more microphones to receive audio input, such as user voice input. In some implementations, one or more cameras or other types of sensors may function as input devices to receive gestural input, such as motion of the controller 100. In some embodiments, additional input devices may be provided in the form of a keyboard, keypad, mouse, touch screen, joystick, control buttons, inertial measurement units (IMUs), and the like. The input device(s) may further include control mechanisms, such as basic volume control button(s) for increasing/decreasing volume, as well as power and reset buttons.

The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when power is on. While a few examples have been provided, the controller 100 may additionally or alternatively comprise any other type of output device. In some instances, output by the one or more output devices may be based on input received by one or more of the input devices. For example, actuation of a control may result in the output of a haptic response by a vibrator located adjacent (e.g., underneath) the control or at any other location.

In addition, the controller 100 may include one or more communication interfaces 1202 to facilitate a wireless connection to a network and/or to another device 1203 of an electronic system. The communication interface(s) 1202 may implement multiple types of wireless or radio technologies to support operation of the controller 100. For example, the communication interface(s) 1202 may implement a radio such as a Bluetooth Low Energy (BLE) radio, a Wi-Fi radio, and/or a cellular radio, and so on. It is to be appreciated that the controller 100 may further include physical ports to facilitate a wired connection to a network, a connected peripheral device, or a plug-in network device that communicates with other wireless networks. In some examples, the communication interface(s) includes a radio frequency (RF) transmitter for communication with the rest of the electronic system. Such RF transmitter may be powered by the rechargeable battery.

In the illustrated implementation, the controller 100 further includes one or more processors 1204 and memory 1206 (or computer-readable media 1206). In some implementations, the processors(s) 1204 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1204 may possess its own local memory, which also may store program modules, program data, and/or one or more operating systems.

The computer-readable media 1206 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1206 may be implemented as computer-readable storage media ("CRSM"), which may be any available physical media accessible by the processor(s) 1204 to execute instructions stored on the computer-readable media 1206. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1204.

Several modules such as instruction, datastores, and so forth may be stored within the memory 1206 and configured to execute on the processor(s) 1204. A few example functional modules are shown as stored in the memory 1206 and executed on the processor(s) 1204, although the same functionality may alternatively be implemented in hardware, firmware, or as a SOC.

An operating system module 1208 may be configured to manage hardware within and coupled to the controller 100 for the benefit of other modules. In addition, the memory 1206 may store a network-communications module 1210 that enables the controller 100 to communicate (e.g., send/receive data), via the communication interfaces 1202, with one or more other devices 1203, such as a host computer and/or the HMD, a game console, etc. The memory 1206 may further include a game-session database 1212 to store data associated with a game (or other application) executing on the controller 100 or on a computing device to which the controller 100 couples. The memory 1206 may also include a device-record database 1214 that stores data associated with devices to which the controller 100 couples. This device-record database 1214 may retain a history of previously connected devices ordered by recency of the connection so that the controller 100 can determine a last known device to which the controller 100 was last connected, at any given instance. The memory 1206 may further store game-control instructions 1216 that configure the controller 100 to function as a gaming controller by sending controller input data to another device that is game-related, and universal-control instructions 1218 that configure the controller 100 to function as a controller of other, non-gaming devices.

The controller 100 may further include the tracking elements 116 introduced above. The tracking elements 116 may be tracking transmitters (e.g., emitters, beacons, etc.) that transmit (e.g., emit) electromagnetic radiation (e.g., visible light, infrared light, etc.). For example, the tracking elements 116 may include light emitting diodes (LEDs) configured to emit light. In this example, an electronic system (of which the controller 100 is a part) may include tracking receivers (e.g., sensors, detectors, etc.) that are configured to receive (e.g., sense, detect, etc.) the electromagnetic radiation transmitted by the tracking elements 116. For example, the electronic system may be a VR gaming system including a HMD to be worn on the user's head, and the HMD may include a plurality of outward-facing tracking receivers (e.g., visible light sensors, infrared light sensors, cameras, etc.) distributed about the HMD and configured to detect the electromagnetic radiation transmitted from the tracking elements 116 disposed on the tracking member 114 of the controller 100. In some examples, the tracking elements 116 include tracking markers configured to reflect light, and the tracking receivers of the electronic system are configured to detect the light reflected from the tracking elements 116. In some examples, the tracking elements 116 include tracking receivers (e.g., sensors, detectors) configured to receive (e.g., sense, detect, etc.) electromagnetic radiation that is transmitted (e.g., emitted) from tracking transmitters (e.g., emitters, beacons). For example, stationary tracking beacons may be positioned about the user's environment and may be configured to widely broadcast (e.g., paint or sweep) pulsed light (e.g., infrared light) towards the controller 100, with the plurality of tracking elements 116 of the tracking member 114 being light sensors (e.g., infrared light sensors) that may receive or be shadowed from the broadcasted, pulsed light. In general, the tracking elements 116 may be used as part of an inside-out positional tracking system or an outside-in positional tracking system. Either way, the output of the tracking receivers may be processed by the electronic system to track the location and/or the orientation of the controller 100 in space. The tracking elements 116 may be disposed in the tracking member 114 or on the outer surface of the tracking member 114. If the tracking elements 116 are disposed in the tracking member 114, the individual tracking elements 116 may be covered by an electromagnetic radiation-transmissive material, such as a transparent window for visible light, an infrared-transmissive plastic window for infrared light, or the like. In some examples, additional tracking elements may be disposed in or on other parts of the controller body 102, such as the head 108 and/or the handle 104.

The controller 100 may further include one or more sensors 520 including, without limitation, one or more proximity sensors 1222 (or touch sensor(s) 1222) and/or one or more pressure sensor(s) 1224. The proximity sensor(s) 1222 may include, without limitation, a capacitive touch sensor(s), a resistive touch sensor(s), an infrared touch sensor(s), a touch sensor(s) that utilizes acoustic soundwaves to detect a proximity of a finger, etc.). The proximity sensor(s) 1222 may be configured to sense proximity of an object, such as a finger, palm, etc., to the proximity sensor(s) 1222, which may be based on any suitable touch-sensing technologies, such as a capacitive touch sensor, a resistive touch sensor, an infrared touch sensor, a touch sensor that utilizes acoustic soundwaves to detect a proximity of a finger, or any other type of proximity sensor. For example, a proximity sensor(s) 1222 may be disposed underneath or on a surface of the device, and/or within or on a finger-operated control (e.g., the control(s) 110, 112(1), 112(2), etc.) in order to detect proximity of a finger(s) to the surface or to the finger-operated control. In response to detecting the proximity (e.g., the finger contacting or hovering above the surface), the proximity sensor(s) 1222 may generate touch data indicative of the proximity of the finger(s). An array of proximity sensors 1222 may be embedded in the handle 104 of the controller body 102 to detect a user's grip. In implementations that utilize capacitive-based sensing, the proximity sensor(s) 1222 may include electrodes (e.g., a transmitter electrode and a receiver electrode of a transcapacitive-type sensor), and voltage can be applied to the electrodes so that the electrodes are configured to measure capacitance changes at the electrodes, which can be translated into touch data in the form of capacitance values that are indicative of proximity of an object to the sensor(s) 1222. For example, capacitance changes at the electrodes of a capacitive-based touch sensor(s) 1222 may be influenced by an object (such as the finger) that is in proximity to the electrodes. In an illustrative example, the handle 104 of the controller body 102 may include an array of proximity sensors 1222 that are spatially distributed partially or completely around the outer surface of the handle 104. The proximity sensors 1222 of the array are not necessarily of equal size and do not necessarily have equal spacing between them, although the array may comprise a grid. The array of proximity sensors 1222 may be responsive to the proximity of the user's fingers to the outer surface of the handle 104. For example, the array of proximity sensors 1222 may be a plurality of capacitive sensors embedded underneath or on the outer surface of the handle 104, or they may be embedded in the handle 104. The outer surface of the handle 104 may comprise an electrically insulative material. The capacitance between such an array of capacitive sensors and a portion of the user's hand is inversely related to the distance therebetween. The capacitance may be sensed by connecting an RC oscillator circuit to an element of the capacitance sensor array, and noting that the time constant of the circuit (and therefore the period and frequency of oscillation) will vary with the capacitance. In this way, the circuit may detect a release of a user's fingers from the outer surface of the handle 104. The proximity sensors 1222 may be connected to a flex circuit within the controller body 102 (e.g., within the handle 104).

The pressure sensor(s) 1222 may include any suitable type of pressure sensing mechanisms, such as piezoelectric sensors, strain gauges, a force sensing resistor(s) (FSR(s)), a force sensing capacitor(s) (FSC(s)), etc. A FSR may include a conductive material spaced apart from a resistive membrane (e.g., a semiconductive material, such as an ink composition), as well as an actuator that is configured to convey a force onto the resistive membrane so that the resistive material contacts the conductive material under the application of a compressive force applied to the actuator. A FSR may exhibit varying resistance in response to variable forces to generate force data corresponding to the resistance values. A FSR can be a "ShuntMode" FSR or a "ThruMode" FSR. With a ShuntMode FSR, the conductive material spaced from the resistive membrane may be a plurality of interdigitated metal fingers. When a force is applied to the actuator of the FSR, the resistive membrane contacts some of the interdigitated metal fingers, which shunts the metal fingers, thereby varying the resistance across the output terminals of the FSR, which can be digitized into a FSR value to generate the force data. In some examples, the controller 100 includes one or more pressure sensors 1224 disposed within the handle 104, in conjunction with the array proximity sensors 1222, which may facilitate sensing of both the onset of grasping by the user, and the relative strength of such grasping or squeezing by the user, which may be facilitate certain gameplay features. In some examples, a pressure sensor(s) 1224 may be disposed in the head 108 and associated with a thumb-operated control (e.g., 110, 112(1), 112(2)) to sense a force of a press of a thumb on the control, and/or a pressure sensor(s) 1224 may be disposed underneath a trigger on the back of the handle 104 to sense a force of a squeeze of the trigger.

Unless otherwise indicated, all numbers expressing quantities, properties, conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A controller for an electronic system, for operation by a user having a hand with a palm, the controller comprising:
    a controller body comprising:
        a head including at least one thumb-operated control; and
        a handle adjoining the head at a neck region, wherein a first linear slot and a second linear slot are defined in the handle at a proximal end of the handle that is adjacent to the neck region, the first linear slot and the second linear slot extending longitudinally along the handle; and
    a hand strap configured to physically bias the palm against an outer surface of the handle, a first end of the hand strap configured to be coupled to an anchor disposed within the first linear slot and protruding from the outer surface of the handle, wherein a slider knob is disposed within the second linear slot and is configured to be moved, by the user, along the second linear slot to cause movement of the anchor along the first linear slot to adjust the first end of the hand strap.

2. The controller of claim 1, wherein:
    the slider knob protrudes from the outer surface of the handle;
    the slider knob is coupled to the anchor by an internal portion of an adjustment mechanism disposed inside of the handle; and
    movement of the slider knob along the second linear slot causes movement of the internal portion of the adjustment mechanism within the handle, which causes the movement of the anchor along the first linear slot to adjust the first end of the hand strap.

3. The controller of claim 2, wherein:
    a plurality of detents are defined in an inner surface of the handle, the plurality of detents arranged longitudinally along the handle;
    the adjustment mechanism further comprises a tooth configured to engage individual ones of the plurality of detents; and
    the adjustment mechanism is movable between a plurality of discrete positions by the user performing operations comprising:
        depressing the slider knob to disengage the tooth from a first detent of the plurality of detents;
        moving the slider knob along the second linear slot while the slider knob is depressed and until the tooth is aligned with a second detent of the plurality of detents; and
        releasing the slider knob to engage the tooth with the second detent.

4. The controller of claim 3, wherein:
    an end of the second linear slot that is closest to a distal end of the handle is positioned a first distance from the distal end of the handle;
    an individual detent of the plurality of detents is positioned a second distance from the distal end of the handle; and
    the second distance is less than the first distance.

5. The controller of claim 3, wherein the adjustment mechanism is made of a resilient material that:
   allows the tooth to disengage from the first detent upon the user depressing the slider knob; and
   biases the tooth into engagement with the second detent upon the user releasing the slider knob after having moved the slider knob.

6. The controller of claim 2, further comprising a support mounted inside of the handle and configured to support the adjustment mechanism within the handle.

7. The controller of claim 1, wherein:
   the handle comprises:
      a front that faces the user when the controller is held in the hand;
      a back opposite the front; and
      two sides; and
   the first linear slot is defined in one of the two sides.

8. The controller of claim 1, wherein the hand strap is coupled to a distal end of the handle.

9. The controller of claim 8, wherein:
   the distal end of the handle comprises an eyelet; and
   a first portion of the hand strap is configured to be passed through the eyelet and attached to an outer surface of a second portion of the hand strap.

10. The controller of claim 9, wherein:
    the hand strap is configured to be tightened around the hand by the user pulling the first portion of the hand strap around the eyelet after passing the first portion of the hand strap through the eyelet; and
    the hand strap is configured to physically bias the palm against the outer surface of the handle when the hand strap is tightened around the hand.

11. The controller of claim 1, wherein at least a portion of an inner surface of the hand strap comprises padding.

12. The controller of claim 1, wherein the first end of the hand strap is configured to be removably coupled to the anchor.

13. A controller for an electronic system, for operation by a user having a hand with a palm, the controller comprising:
    a controller body comprising:
       a head; and
       a handle adjoining the head at a neck region, wherein a first linear slot and a second linear slot are defined in the handle adjacent to the neck region, the first linear slot and the second linear slot extending longitudinally along the handle;
    an anchor disposed within the first linear slot and protruding from an outer surface of the handle; and
    a hand strap configured to physically bias the palm against the outer surface of the handle, a first end of the hand strap configured to be coupled to the anchor, wherein a slider knob is disposed within the second linear slot and is configured to be moved, by the user, along the second linear slot to cause movement of the anchor along the first linear slot to adjust the first end of the hand strap.

14. The controller of claim 13, wherein:
    the slider knob protrudes from the outer surface of the handle;
    the slider knob is coupled to the anchor by an internal portion of an adjustment mechanism disposed inside of the handle; and
    movement of the slider knob along the second linear slot causes movement of the internal portion of the adjustment mechanism within the handle, which causes the movement of the anchor along the first linear slot to adjust the first end of the hand strap.

15. The controller of claim 14, wherein:
    a plurality of detents are defined in an inner surface of the handle, the plurality of detents arranged longitudinally along the handle;
    the adjustment mechanism further comprises a tooth configured to engage individual ones of the plurality of detents; and
    the adjustment mechanism is movable between a plurality of discrete positions by the user performing operations comprising:
       depressing the slider knob to disengage the tooth from a first detent of the plurality of detents;
       moving the slider knob along the second linear slot while the slider knob is depressed and until the tooth is aligned with a second detent of the plurality of detents; and
       releasing the slider knob to engage the tooth with the second detent.

16. The controller of claim 13, wherein the hand strap is coupled to a free end of the handle.

17. The controller of claim 16, wherein:
    the free end of the handle comprises an eyelet; and
    a first portion of the hand strap is configured to be passed through the eyelet and attached to an outer surface of a second portion of the hand strap.

18. A method for coupling a hand strap to a controller body of a controller and for adjusting the hand strap, the method comprising:
    attaching a first end of the hand strap to an anchor disposed within a linear slot defined in a handle of the controller body at a proximal end of the handle where the handle adjoins a head of the controller body, the linear slot extending longitudinally along the handle;
    adjusting the first end of the hand strap by moving the anchor along the linear slot;
    passing a second end of the hand strap through an eyelet disposed at a distal end of the handle;
    pulling the second end of the hand strap while a hand is gripping the handle to pass a first portion of the hand strap through the eyelet until an inner surface of a second portion of the hand strap comes into contact with a back of the hand; and
    attaching the first portion of the hand strap to an outer surface of the second portion of the hand strap.

19. The method of claim 18, wherein the attaching the first end of the hand strap to the anchor comprises:
    aligning a first hole defined in an anchor attachment mechanism disposed at the first end of the hand strap with a second hole defined in the anchor; and
    inserting a fastener within the first hole and the second hole to fasten the anchor attachment mechanism to the anchor.

20. The method of claim 18, wherein the adjusting the first end of the hand strap comprises moving a slider knob along a second linear slot defined in the handle at the proximal end of the handle, wherein the slider knob is coupled to the anchor, and wherein movement of the slider knob along the second linear slot causes movement of the anchor along the first linear slot to adjust the first end of the hand strap.

* * * * *